United States Patent [19]

Giordano

[11] 4,066,847
[45] Jan. 3, 1978

[54] AUTOMATIC CALL ANSWERING AND SEQUENCING SYSTEM

[75] Inventor: John K. Giordano, Oakland, Calif.

[73] Assignee: Automation Electronics Corporation, Oakland, Calif.

[21] Appl. No.: 727,684

[22] Filed: Sept. 29, 1976

[51] Int. Cl.² .................... H04M 1/72; H04M 3/50
[52] U.S. Cl. ................................. 179/99; 179/27 D
[58] Field of Search ........... 179/18 BG, 27 D, 27 FC, 179/99, 6 C

[56] References Cited

U.S. PATENT DOCUMENTS

| | | | |
|---|---|---|---|
| 2,923,777 | 2/1960 | Schneider | 179/27 D |
| 3,334,191 | 8/1967 | Arseneau et al. | 179/27 D |
| 3,692,950 | 9/1972 | Lecoanet et al. | 179/27 D |
| 3,702,380 | 11/1972 | Gueldenpfenning et al. | 179/27 D |
| 3,752,936 | 8/1973 | Morse | 179/99 |
| 3,943,290 | 3/1976 | Golden | 179/6 C |
| 3,969,589 | 7/1976 | Meise, Jr. et al. | 179/27 D |

Primary Examiner—Kathleen H. Claffy
Assistant Examiner—Randall P. Myers
Attorney, Agent, or Firm—David B. Harrison

[57] ABSTRACT

An automatic incoming telephone call sequencing system is disclosed for use with multiple incoming line key telephone instruments. The sequencing system includes a scanner for scanning all of the incoming lines and detecting the arrival of an incoming call on each of the lines, an identifier for identifying each of the lines following detection by the scanner of an unanswered call thereon, a queue memory for storing in the order of receipt all of the coded line signals from the identifier and providing an output queue signal corresponding to the line having the oldest unanswered call, a signaller for providing a key of the key telephone instrument with a distinct visual indication from the output queue signal, and an operator interrupt detector for detecting the operator's answer of the line having the oldest unanswered call and for thereupon advancing the queue memory to the next oldest call whereupon the signaller provides the distinct visual indication to the key corresponding to the next oldest unanswered incoming call, etc. Automatic announcement equipment may also be incorporated to explain the answering procedure to the calling parties.

23 Claims, 17 Drawing Figures

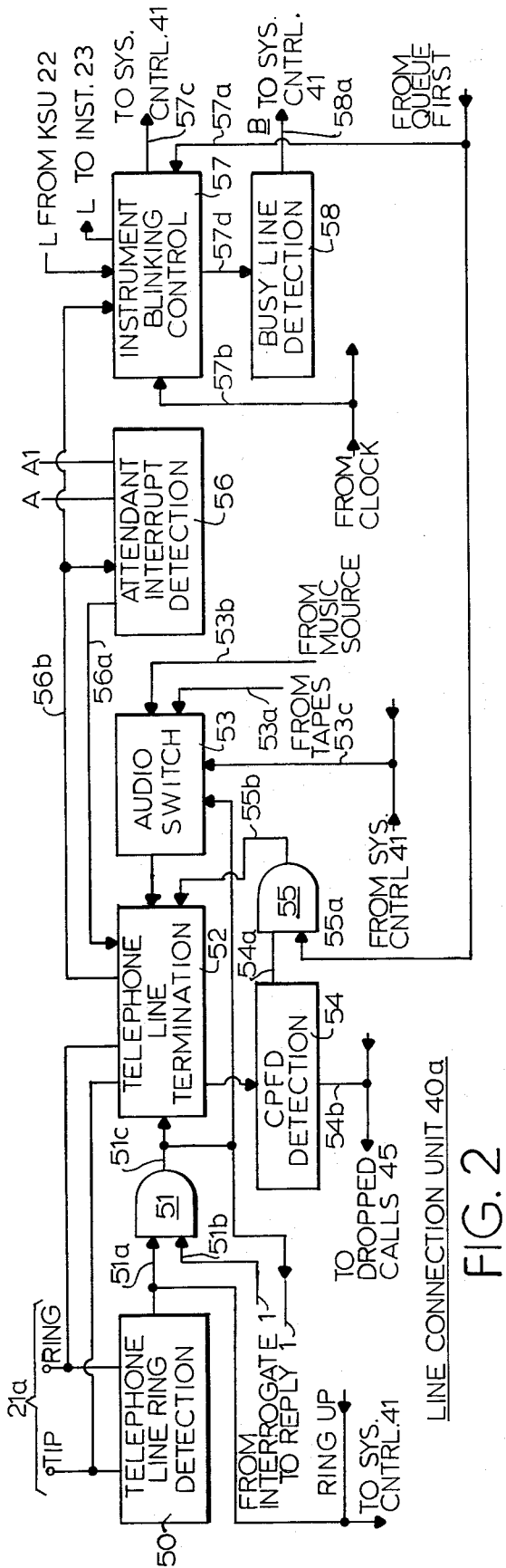
FIG. 2 LINE CONNECTION UNIT 40a
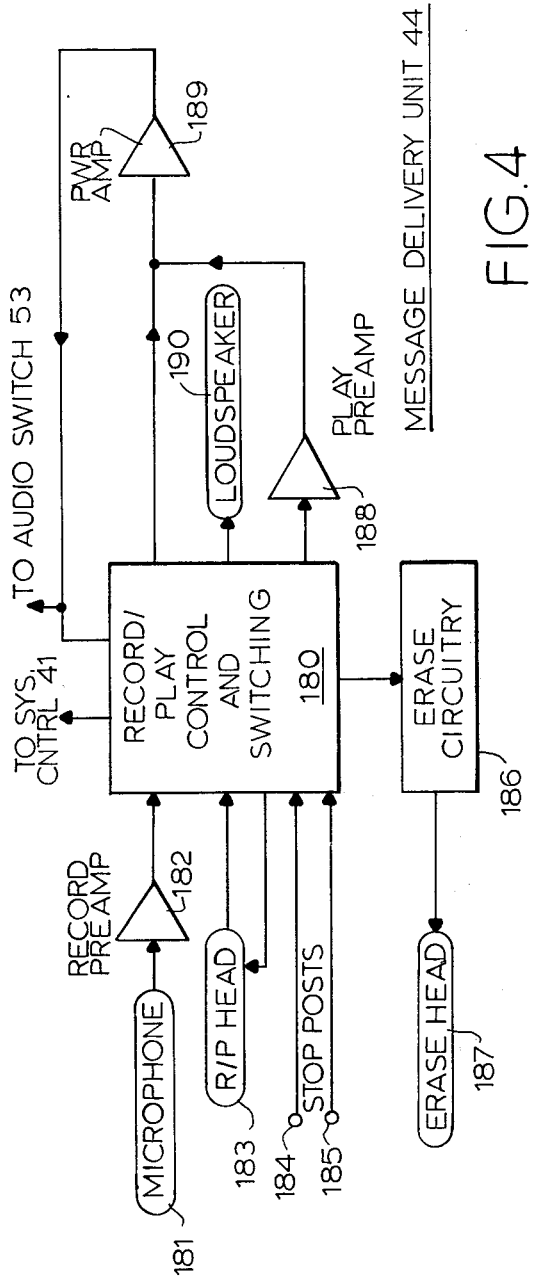
FIG. 4 MESSAGE DELIVERY UNIT 44

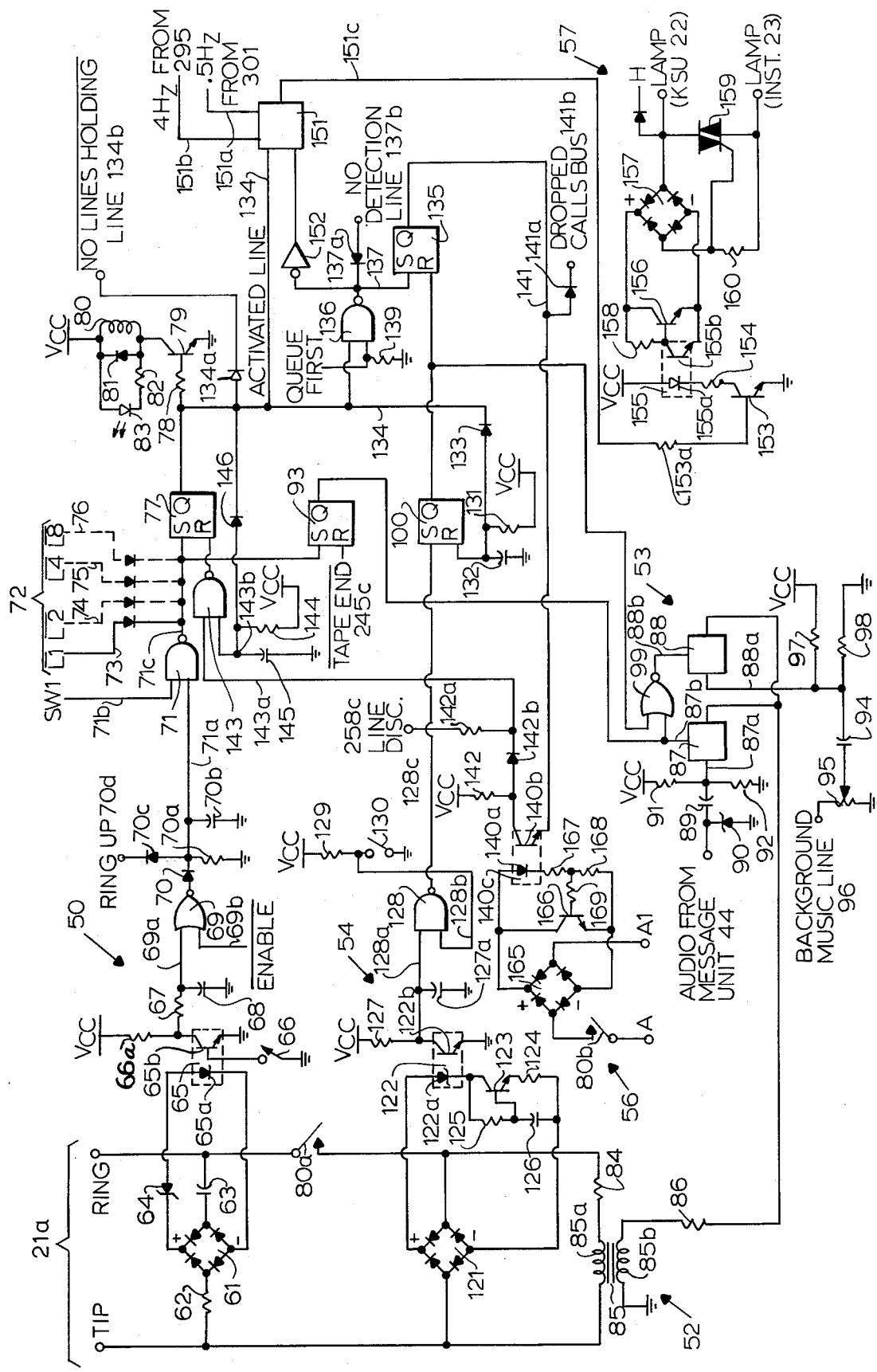
FIG. 5 LINE CONNECTION UNIT 40a

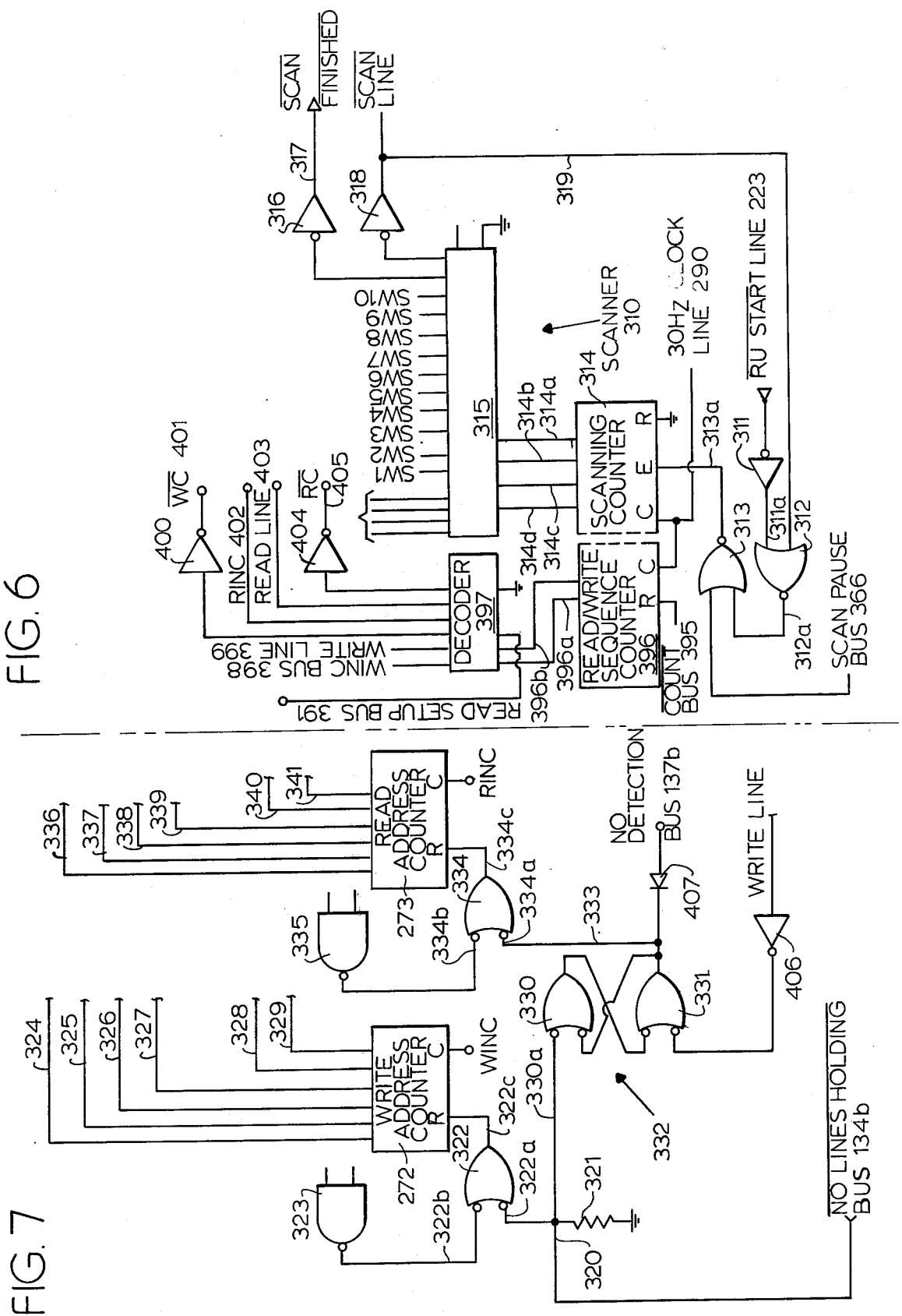

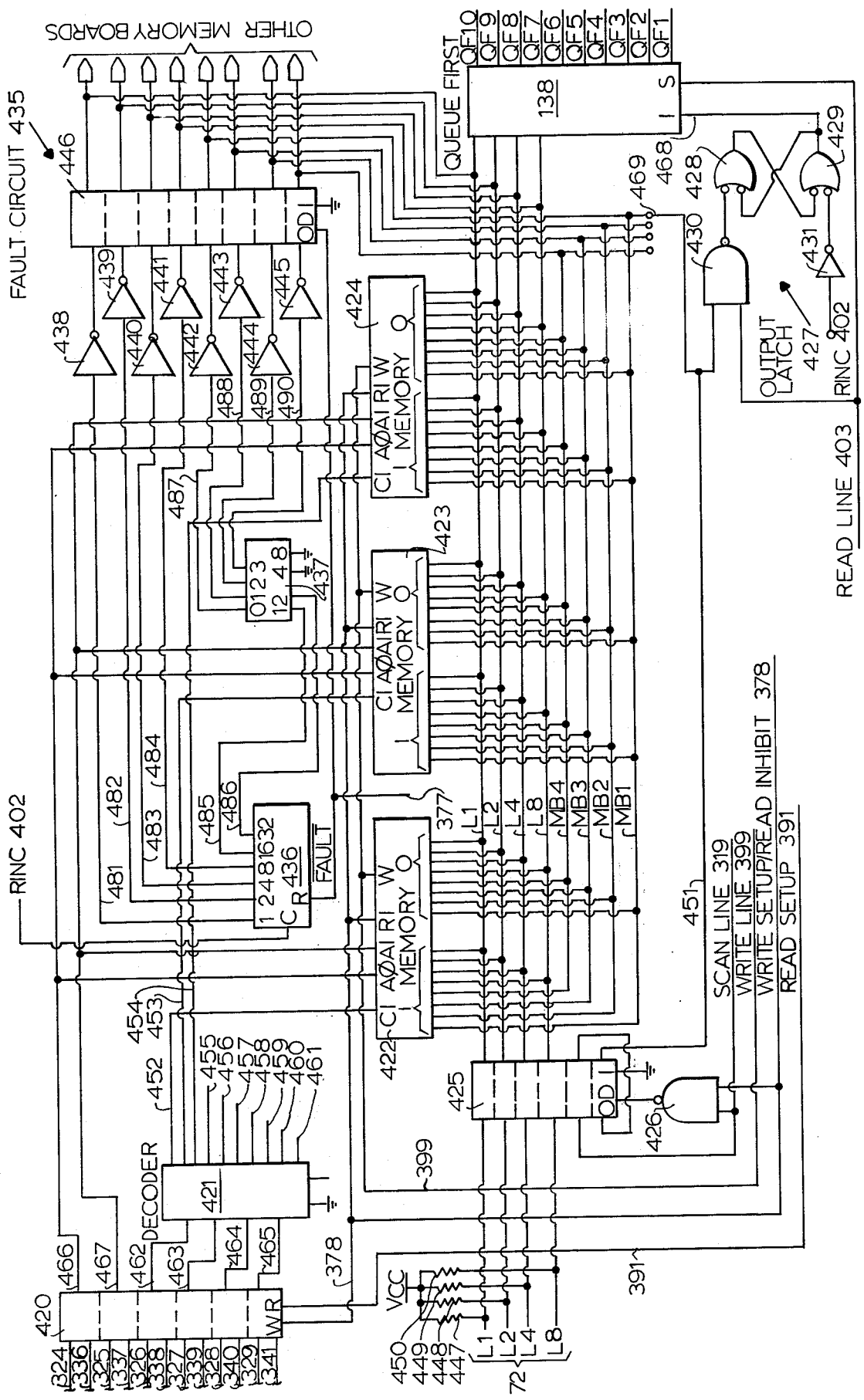
FIG. 9 QUEUE MEMORY UNIT 43

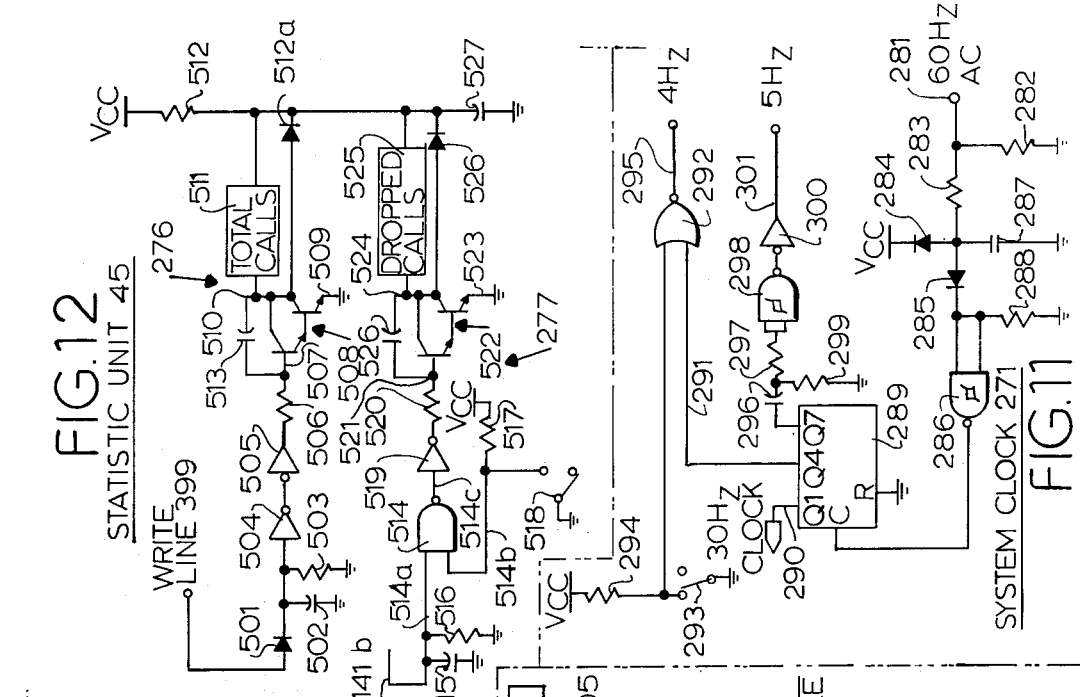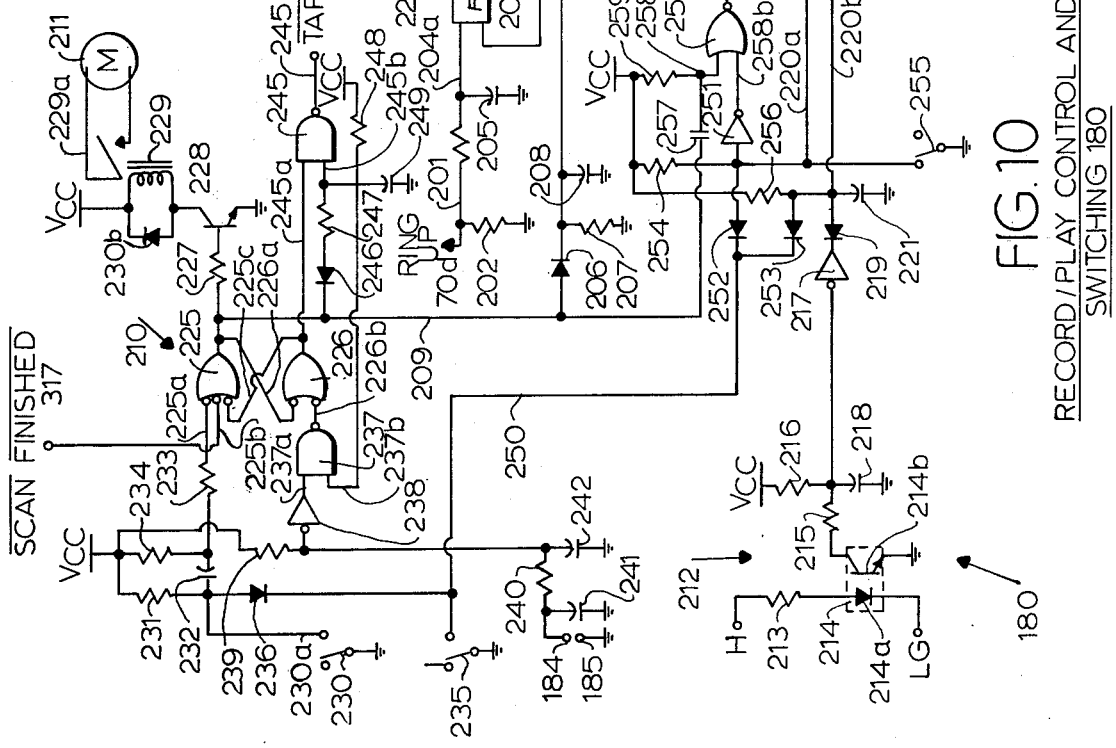

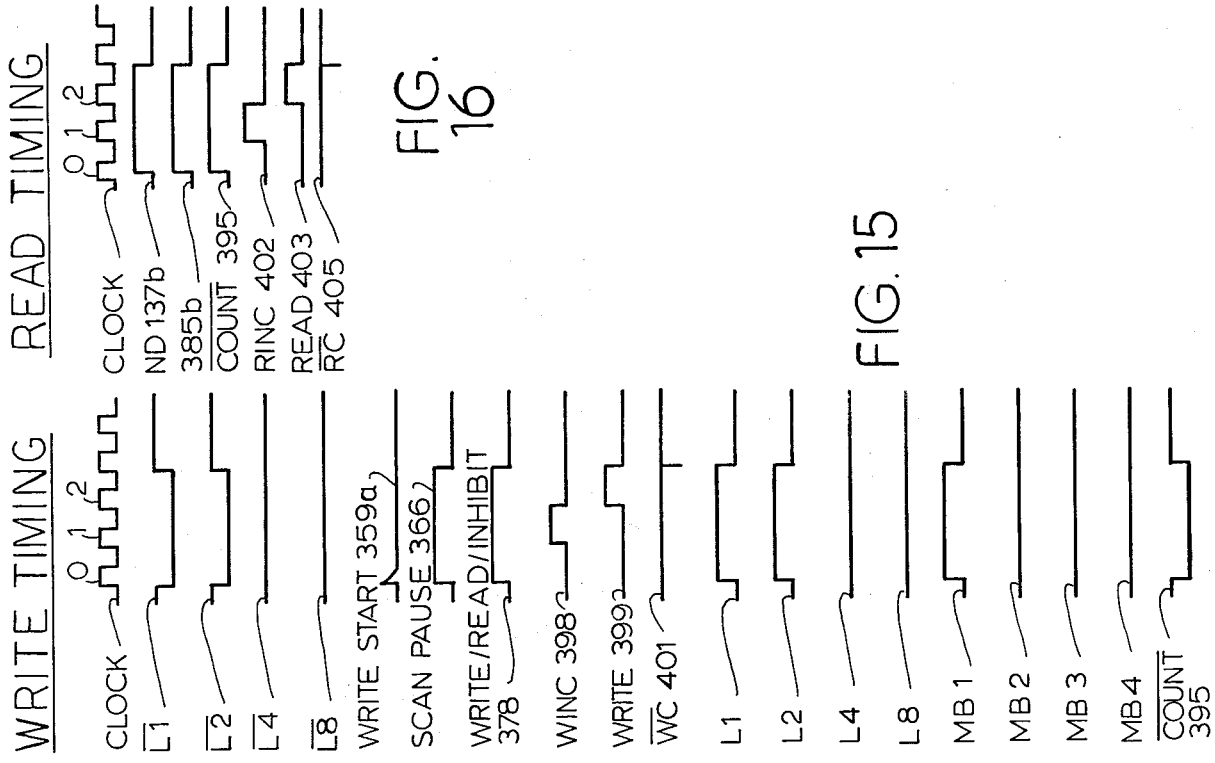
FIG. 16
FIG. 15
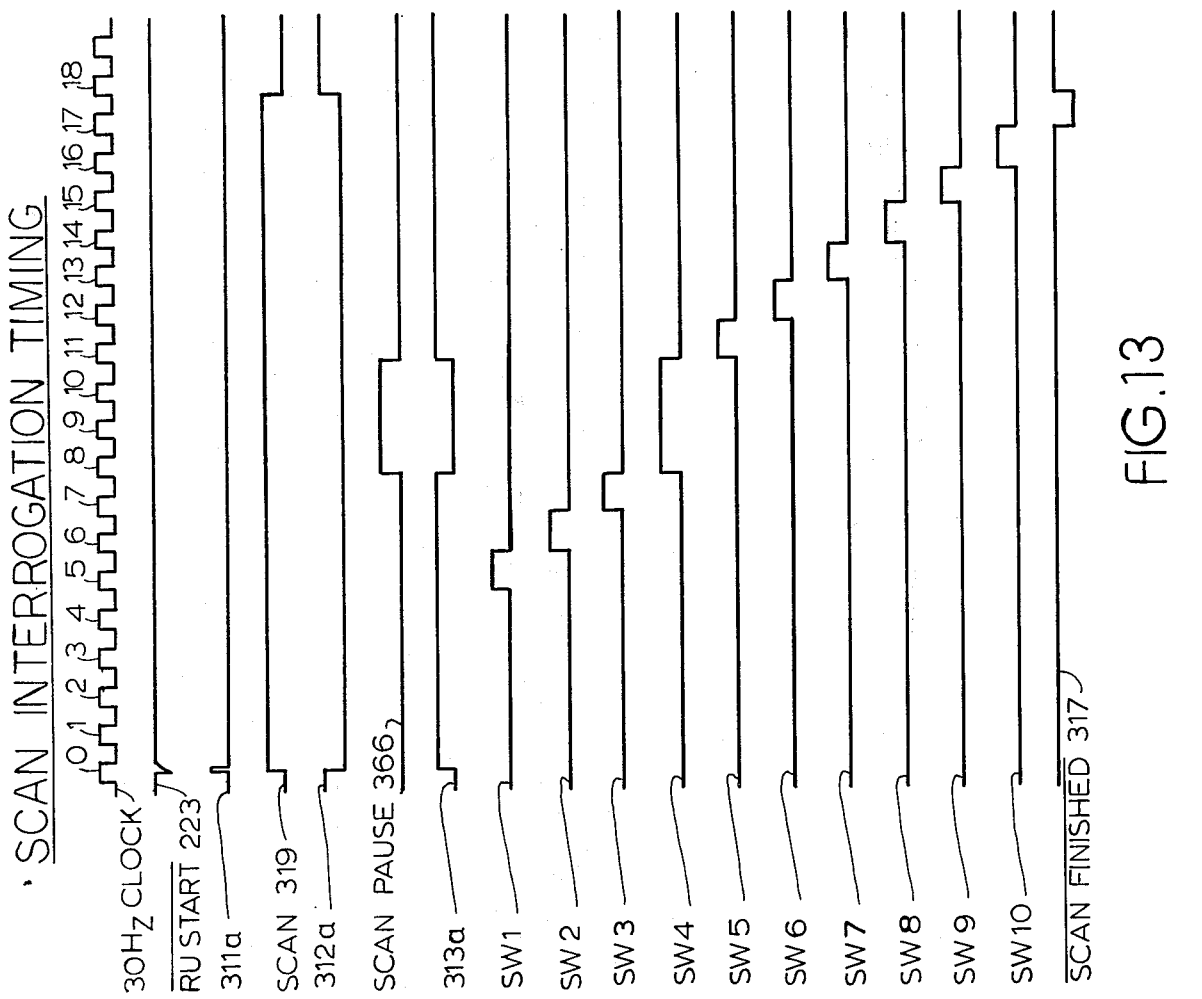
FIG. 13

AUTOMATIC CALL ANSWERING AND SEQUENCING SYSTEM

BACKGROUND OF THE INVENTION

This invention relates to telephone call sequencing equipment. More particularly, the present invention provides an automatic call answering and sequencing system for use with multiple incoming telephone lines connected to subscriber key service telephone units.

Telephones capable of receiving a call from a selected incoming line among numerous such lines are well known and widely used. One type of such a telephone is known as a key telephone or key service unit (KSU). These units are characterized by a handset and dial and a plurality of illuminable buttons or keys, each key being depressed to select the incoming line to which it is connected.

In key telephone systems, an unanswered incoming call is signalled to the telephone attendant by repetitive light flashes at the key of the line having the call and often by rings from the telephone bell as well. When the attendant picks up the handset and depresses the flashing key, the line having the incoming call is connected to the handset and the key become illuminated without flashing.

In telephone installations where there are only a few incoming lines or where there are many lines but few and infrequent incoming calls, the attendant or attendants are able to handle each call immediately upon arrival. However, where the system includes, e.g. ten or more incoming lines and at times all or many of the lines have unanswered incoming calls, a need has arisen to establish a priority sequence for the incoming calls so that the oldest call is brought to the attention of the attendant.

Concomitantly, a further need has arisen to answer the incoming calls shortly after they are received with a message explaining the delay and the fact that the call will be attended in the order of its arrival relative to other incoming calls. Thereafter, preferably, pleasant background music should be provided to the caller. Heretofore, no single system has met these requirements.

Highly complex call queuing systems have existed for routing calls on thousands of telephone lines to hundreds of operators, usually located at central offices of the telephone system. Such systems were vastly too complicated and expensive for use by telephone service subscribers having e.g. ten to one hundred sixty lines serviced by one or a few attendants. On the other hand, simple batch priority queuing systems for key service telephone installations have been proposed. In those systems all calls incoming within a predetermined time interval were indicated as priority calls with calls arriving during a second interval and later intervals not being so indicated to the attendant until all of the calls in the first batch were handled. Such batch systems were described in e.g. U.S. Pat. No. 3,752,936 to Morse. Those systems had the drawback that no priority was established between calls within each batch: when the attendant was unable to handle the calls in the batch rapidly, those calls were often handled out of order of receipt, which is the very same problem occuring with key telephones in the absence of any sequencing system.

Moreover, heretofore there has been no automatic answering and sequencing system available for addition to existing key service telephone installations through use of existing plug connections and without any internal modifications to the equipment of such installations. This has been a particularly significant drawback because of the reluctance of the telephone service companies to allow their equipment to be altered or modified in any way except to accomodate other of their own equipment.

SUMMARY OF THE INVENTION

An object of the present invention is to provide an automatic telephone answering and sequencing system which codes each separate unattended incoming call with an arrival priority relative to all other unattended incoming calls and which indicates to each attendant each oldest unattended call, enabling the calls to be handled in precise order of receipt.

Another object of the present invention is to provide an automatic telephone answering and sequencing system which provides an announcement to each caller that the call has been received and will be attended in order of receipt relative to other incoming calls.

A further object of the present invention is to provide an automatic telephone answering and sequencing system which is fully compatible with and plugs into existing standard Bell System and General Telephone System key service telephone units without any internal modifications thereto.

Yet another object of the present invention is to provide an automatic telephone answering and sequencing system which automatically disconnects from an incoming line when the attendant connects to the line and also if the calling party hangs up before that call is handled by the attendant.

A still further object of the present invention is to provide an automatic, solid state telephone answering and sequencing system which is efficient, economical and reliable in design, manufacture and operation.

These and other objects and advantages are accomplished by an automatic answering and sequencing system having for each incoming line a line unit therefore. The line unit connects to its line when a call is incoming thereon, and disconnects when the attendant answers the line or if the calling party hangs up. The line units are connected to a central control unit to which a message delivery unit, a queue memory unit, and an operator's console are also connected.

When each call is received its corresponding line unit signals to the control unit and the control unit then scans all of the lines and writes into the queue memory stack the identity of the line having the incoming call, with the oldest unhandled call being written at the front of the stack and the newest written at the rear thereof.

At the completion of each scan the control unit enables the message delivery unit which thereupon delivers an appropriate expository message to the line or lines having newly received incoming calls. At the completion of the announcement, background music may be delivered to the lines then awaiting handling.

In operation, the system provides a fast, priority flicker visual signal to the attendant at that key of each key telephone which is connected to the line having the oldest unhandled call. When an attendant answers the line flashing at the priority flicker rate, the control unit sequences the memory unit to the line having the next oldest unhandled call, and its key thereupon commences to signal at the priority flicker rate.

The system may also include a statistical reporting unit for logging data such as total incoming calls and total dropped calls, wherein the calling party hung up before the attendant was able to handle the call.

The system may also include a fault circuit to reenter into the queue memory unit the identities of incoming unhandled calls that were dropped from the memory through a power failure, etc.

BRIEF DESCRIPTION OF THE DRAWINGS

FIG. 2 is a detailed block diagram of one of the identical incoming line connection units of the system of FIG. 1.

FIG. 4 is a block diagram of the message delivery unit of the system of FIG. 1.

FIG. 5 is a detailed schematic logic diagram of the line connection unit shown in FIG. 2.

FIG. 6 is a detailed schematic logic diagram of a line scanning element and a read/write sequence counter element of the control unit shown in FIG. 3.

FIG. 7 is a detailed schematic logic diagram of a read/write address counter element of the control unit shown in FIG. 3.

FIG. 9 is a detailed schematic logic diagram of the queue memory unit and queue first decoder shown in FIG. 3.

FIG. 10 is a detailed schematic logic diagram of the record/play control and switching circuitry of the message delivery unit shown in FIG. 4.

FIG. 11 is a detailed schematic logic diagram of a system clock of the system shown in FIG. 4.

FIG. 12 is a detailed schematic logic diagram of the statistical recording unit shown in FIG. 1.

FIG. 13 is a timing diagram of the scan interrogation operation of the control unit shown in FIG. 6.

FIG. 15 is a timing diagram of the write operation of the control and queuing units shown in FIGS. 7, 8 and 9.

FIG. 16 is a timing diagram of the read operation of the control and queuing units shown in FIGS. 7, 8 and 9.

DETAILED DESCRIPTION OF A PREFERRED EMBODIMENT

Figure 1:
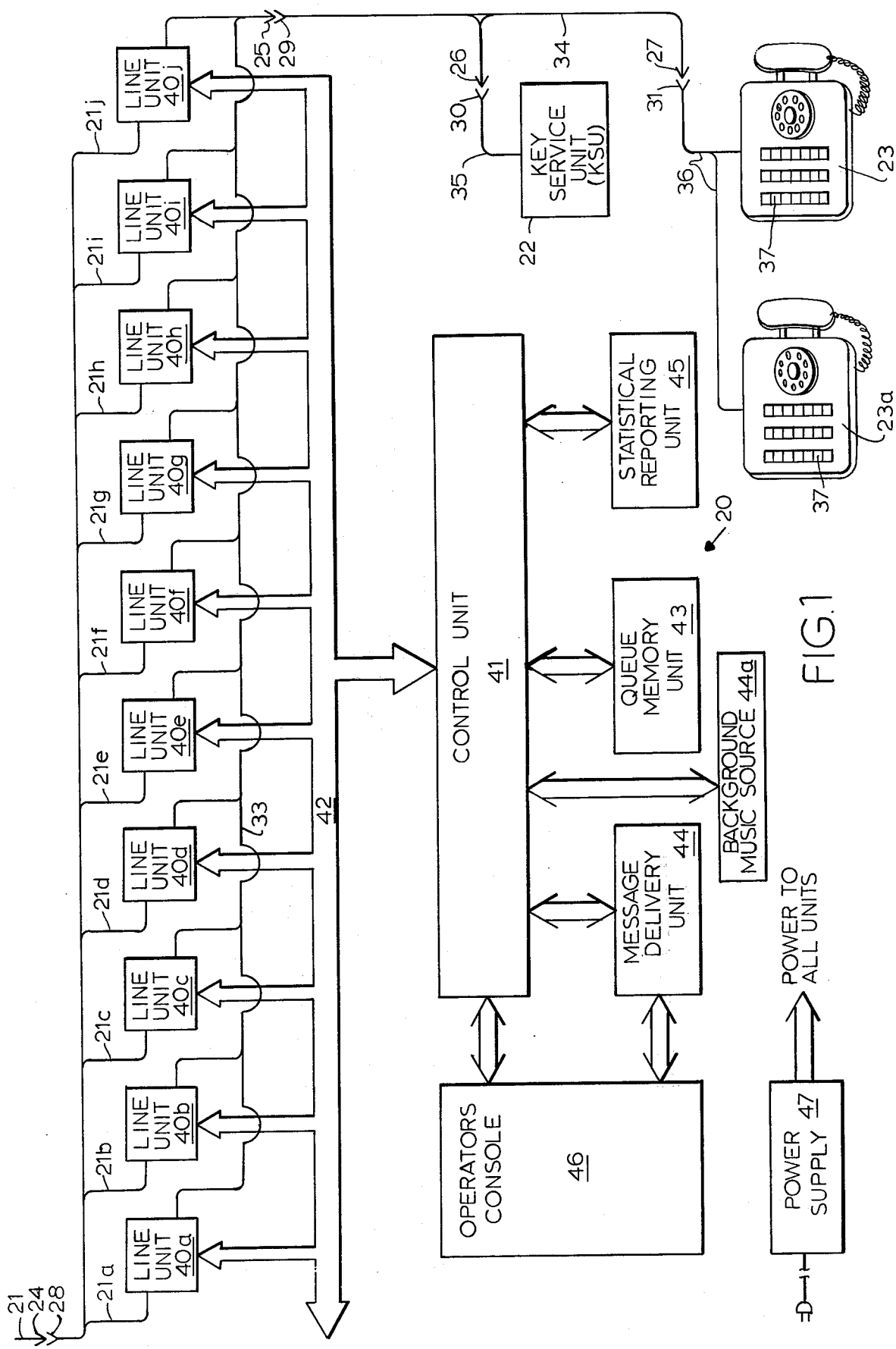
FIG. 1 is an overall block diagram of a multiple line automatic telephone key service call answering and sequencing system incorporating the principles of the present invention. Ten incoming lines are shown by way of example. The system shown may easily be expanded to accommodate from ten to one hundred sixty lines.

System Architecture, FIG. 1

A ten line key switched telephone call answering and sequencing system 20 is depicted in the block diagram of FIG. 1, although the system 20 may easily be expanded to handle more than ten lines. Pictorially represented in FIG. 1 are standard telephone system components including an incoming ten pair cable 21 (having pairs 21a, 21b, 21c, 21d, 21e, 21f, 21g, 21h, 21i and 21j), at least one a key service unit 22, and at least one corresponding telephone key instrument 23. Additional parallel connected telephone instruments are exemplified by the second instrument 23a. Plugs 24, 25, 26 and 27 and mating jacks 28, 29, 30 and 31, which are standard telephone system hardware along with their interconnecting cables 32, 33, 34, 35 and 36 enable the cable 21, KSU unit 22 and instrument 23 to be interconnected without other modification directly with the system 20 and with each other, as will be described in more detail hereinafter. Each telephone key instrument 23, 23a is provided with characteristic illuminable key buttons 37 which may be depressed by the attendant to select one of the incoming lines 21 having an unanswered incoming call as indicated by flashes at the depressed key 37.

The call answering and sequencing system 20 incorporating the principles of the present invention is preferably implemented around a special purpose digital computer with hard wired control logic. It could also be implemented, presently at greater expense and with less convenience, with microprocessor technology having its control logic implemented as software. Whether the present invention is implemented as the hardware system 20 or as a software system, it is to be understood that it must have the functional capabilities of the system 20 to be described hereinafter. Preferably, the system 20 is designed with low power complementary metal oxide semiconductor (CMOS) integrated circuits to minimize supply power and heat dissipation requirements. A table of component parts with values and identification is set forth at the end of this specification.

There are eight basic functional subsystems in the call answering and sequencing system 20. A line connection unit 40 is provided for each incoming line (the line units for the ten incoming lines 21a-j are labelled 40a, 40b, 40c, 40d, 40e, 40f, 40g, 40h, 40i and 40j, respectively. Each unit 40 is internally electrically identical with every other unit 40 except for internal programming connections identifying it with the particular line 21 to which it is connected).

A control unit 41 provides the hardwired digital computer of the system 20. The control unit 41 provides all control and monitoring functions in accordance with calls incoming on the cable 21 and the actions of an attendant operating the telephone key instrument 23 in response to flashing signals of the illuminable keys 37. A data and control bus 42 interconnects each of the line units 40a–40j and the control unit 41.

A queue memory unit 43 records the order of arrival of each incoming call and provides a queue of calls awaiting attention by the attendant, with the longest awaiting call given a distinctive first priority flashing signal at the appropriate key 37.

A message delivery unit 44 delivers a prerecorded short announcement to each line having an incoming call. Typically, the message identifies the called party and tells the caller that his or her call will be handled shortly, in its order of receipt with respect to the other calls. After completion of the announcement the line 21 is preferably switched to pleasant background music originating at a background music source 44a such as an FM radio receiver.

A statistical reporting unit 45 is also preferably provided to count the total number of calls received by the system 20 during a given time interval. The number of incompleted incoming calls in which callers hung up while in the queue of calls awaiting attention may also be accumulated by the statistical unit 45 e.g. as a measure of attendant efficiency. An operator's console 46 centralizes switches and monitors for operator convenience at a centrally accessible location, and a power supply 47 delivers operating power from the primary power line to all of the units of the system 20.

The control unit 41 and data bus 42 are of sufficient capacity to handle up to 40 incoming lines and may readily be expanded to handle up to 160 incoming lines. The ten lines 21a–j, shown in FIG. 1, are by way of illustration, and not limitation.

Line Connection Unit 40, FIGS. 2 and 5

Figure 14:
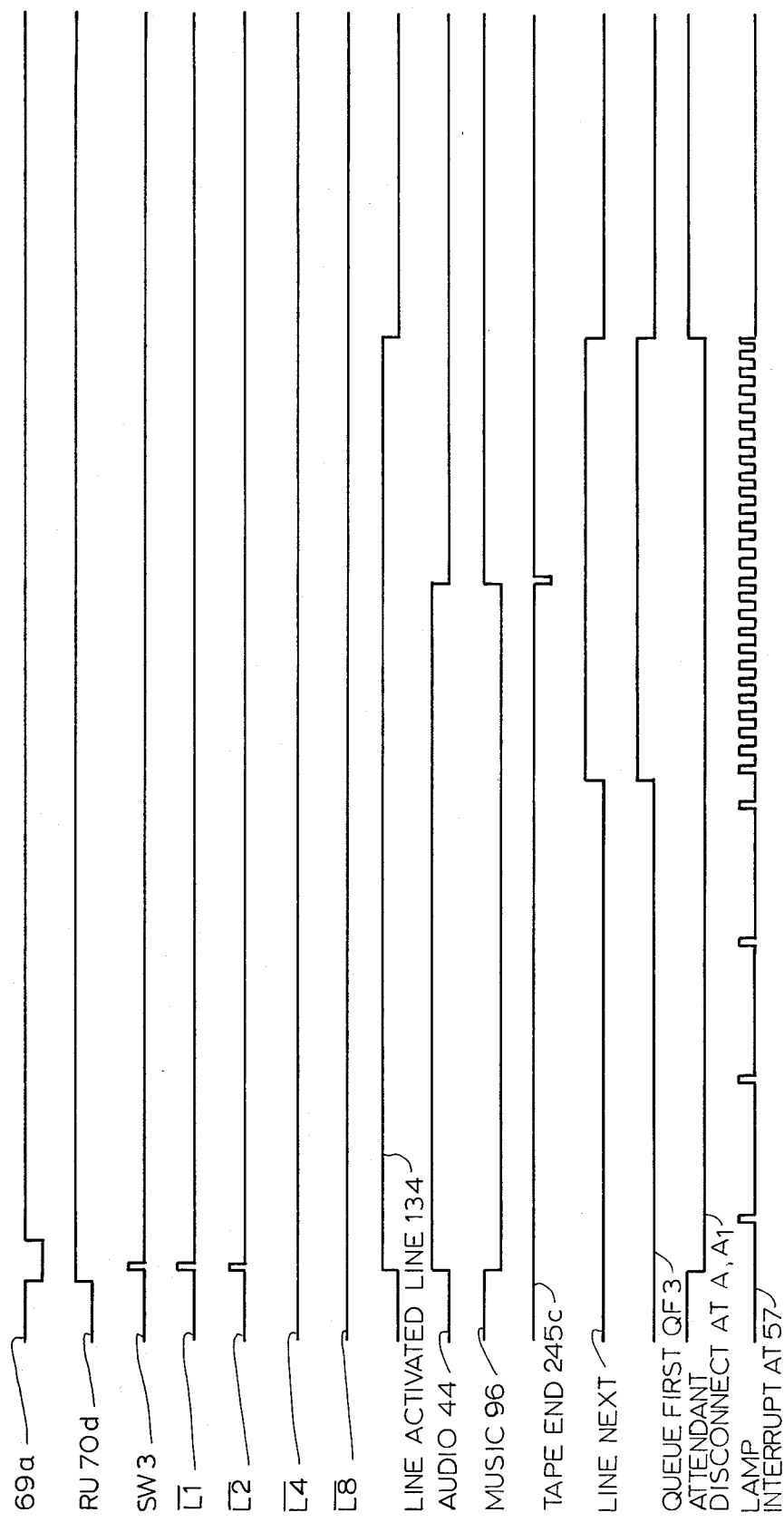
FIG. 14 is a timing diagram of the operation of the incoming line connection unit shown in FIG. 5.

Each line connection unit 40a is depicted functionally in the block diagram of FIG. 2 and electrically in the electrical schematic diagram of FIG. 5 and the timing diagram of FIG. 14. Functionally, each line connection unit 40 includes a telephone line ring detection circuit 50 which is connected to the tip and ring wires of a line pair of the incoming cable 21. For clarity, it is assumed that the line connection unit 40a is connected to the first line 21a, although it could as well be connected to any one of the other nine incoming lines 21b–j.

The detection of an incoming call on the line 21a by the detection circuit 50 causes an enabling signal to be applied at one input 51a of a two input AND gate 51 and to enable an interrogation scan sequence in control 41. An interrogate signal is sent by the control unit 41 operating in a scanning mode and applied to enable the other input 51b of the AND gate 51. When both inputs 51a and 51b are enabled, so is an output 51c which is applied to activate a telephone line termination circuit 52, and an audio switch 53. The output 51c is also sent back to the control unit 41 to activate the message delivery unit 44 and provide a queue priority input to the queue memory unit 43. (The message delivery unit 44 is activated at the end of the scan of all the lines.)

The telephone line termination circuit 52 "answers" the incoming call on the line 21a by applying a load to the line which is the electrical equivalent of the load applied to each line by the telephone key instrument 23. Thus, the telephone line termination circuit 52 in effect tells the central office equipment of the telephone company that its ringing signal is no longer needed because the called party has answered. (Actually, the human attendant is not yet on the line.) The audio switch 53 then closes to pass a prerecorded message from the message delivery unit 44 on its input 53a through the termination circuit 52 and onto the line 21a for transmission to the calling party. The audio switch 53 is provided with another audio input 53b which may be from a source of background music. A control signal input 53c controls the audio switch in accordance with signals received from the control unit 41.

The telephone line termination circuit 52 is also connected to a calling party forced disconnect (CPFD) detection circuit 54. This detection circuit constantly monitors incoming calls on the line 21a to detect whether the calling party has hung up prematurely. In this event, two outputs 54a and 54b are enabled. The output 54a provides one input to a two input AND gate 55. The other input 55a to the AND gate 55 is supplied from the system control unit 41 as a queue first signal. An output 55b of the AND gate 55 is connected to the line termination circuit 52. When the output 55b is enabled, the termination circuit 52 disconnects from its line 21a. In operation, the queue first signal supplied at the input 55a of the AND gate 55 occurs when the line 21a is thought by the control unit still to have a caller on the line and to be first in the queue. The output 54b from the calling party forced disconnect detector 54 is supplied through the control unit to the statistical reporting unit 45 to record the disconnected call as a dropped call.

When the attendant depresses the key 37 corresponding to the line 21a, the system 20 must be disabled so as not to interfere with the attendant. Consequently, the line connection unit 40a includes an attendant interruption detection circuit 56 having inputs A and A1 from the KSU 22 and an output 56a connected to the line termination circuit 52. A line 56b from the termination circuit 52 enables the attendant interruption detector 56 and an instrument blinking control circuit 57 whenever the line termination circuit 52 terminates the line 21g. The instrument blinking control 57 is connected in series in the lamp wire L between the KSU 22 and telephone key instrument 23 and functions to provide the lamp in the key 37 of the instrument 23 with a four per second flashing priority signal when the incoming call on the line 21a is first in line in the queue of incoming calls. Thus, the blinking control 57 is supplied with the queue first signal at an input 57a, and is supplied at an input 57b with a four per second flashing rate priority signal from the clock in the control unit 41. The blinking control 57 provides one output 57c to the control unit 41 and another output 57d to a busy line detection circuit 58.

The busy line detection circuit 58 is paralleled with like circuits in all of the other line connection units 40 of the system 20 for the purpose of ascertaining if an attendant is on any of the lines. If the attendant is not on any of the lines 21, the system 20 assumes that the attendant is therefore available to answer the first incoming call without any need for a queue or for a prerecorded message explaining the delay in answering. Consequently, the busy line detector 58 disconnects the system 20, unless the attendant is already handling a call on another line. For this purpose, the busy line detector 58 is connected through an output 58a to the control unit 41.

The line connection unit 40a is depicted schematically in FIG. 5. Therein, the incoming line 21a having a tip wire and a ring wire first encounters the ring detection circuit 50 which includes a bridge rectifier 61 having one AC node connected through a resistor 62 to the tip wire and the other AC node connected through a blocking capacitor 63 to the ring wire. The DC circuit of the bridge 61 is passed through a voltage protection zener diode 64 and a light emitting diode 65a within an optical isolator 65.

The isolator 65 includes a transistor 65b having an external base connection which is connected to ground through a line 21a to an on-off switch 66 which may be located at the operator's console 46. When the switch 66 is closed, the transistor 65b is locked off and the line connection unit 40a is thereby deactivated.

The emitter of the transistor 65b is grounded, whereas the collector is connected through a load resistor 66a to the plus voltage supply bus $V_{cc}$. The collector is also connected to a resistor 67 which in turn is connected to a shunt capacitor 68 and to an input 69a of a NOR gate 69. The resistor 67 and capacitor 68 form an RC network having a time constant sufficiently long (about one second of delay) to eliminate pulsations from the ringing signal on the line 21a. Another input to the gate 69 is from an $\overline{\text{ENABLE}}$ signal generated by the busy line detector 58, depicted schematically as a portion of the control circuitry of FIG. 10.

The output of the gate 69 is applied through a diode 70 to an input 71a of a NAND gate 71. (The NAND gate 71 is the electrical implementation of the AND gate 51 shown in FIG. 2.) Shunting the input 71a to ground are a high value resistor 70a and a high value capacitor 70b. A diode 70c is also connected to the input 71a to provide a RING UP control signal line 70d to the control unit 41. Another input 71b is connected to a line interrogate bus SW1 from the control unit 41 (see FIG. 6).

The NAND gate 71 has an output 71c which is connected through an identifier diode matrix to a parallel four bit binary line connection unit identifier bus 72. A diode 73 is shown by solid lines to be connected to indicate in binary the first line 21a whereas three other adjacent diodes 74, 75, and 76 are not connected (and are shown with broken lines). If the connection unit 40a were connected to e.g. the third line 21c, then both diodes 73 and 74 would be connected, whereas if the connection unit were e.g. connected to the eighth incoming line 21h, then only the diode 76 would be connected, etc.

The output 71c is also connected to a set (S) input of a set-reset flip flop 77. The Q output of the flip flop 77 is applied through a bias resistor 78 to the base of a power transistor 79 having its emitter grounded and its collector series connected with a relay armature 80, which is in turn connected to the plus voltage bus $V_{cc}$. Paralleled across the armature 80 is a bucking diode 81 and a series network of a resistor 82 and a light emitting indicator diode 83 which may be located on the operator's console or elsewhere to indicate the presence of an incoming call on the first line 21a. With an incoming call, the armature 80 becomes energized which activates the telephone line termination unit 52.

The telephone line termination unit essentially comprises three components, contacts 80a of the relay 80, a current limiting and matching resistor 84 and the primary 85a of an audio transformer 85. The secondary 85b of the audio transformer 85 is connected between ground and a series resistor 86 to the audio switch unit 53 which includes two bilateral audio gates 87 and 88.

Audio from the message delivery unit 44 is supplied through a blocking capacitor 89 to an input 87a of the audio switch 87. A zener diode 90 limits audio peaks to a predetermined safe level. Voltage divider resistors 91 and 92 assure proper biasing of the input 87a. The gate 87 is controlled at a control input 87b from a control signal received from a Q output of a set-reset flip flop 93 having its set input connected to the output 71c of the AND gate 71, and having its reset (R) input connected to a $\overline{\text{TAPE END}}$ control signal generated in connection with the message delivery unit 44 (see FIG. 10).

The other audio gate 88 has its input 88a connected through a blocking capacitor 94 and a level setting potentiometer 95 to a background music input line 96 extending from the music source 44a. Biasing resistors 97 and 98 provide the correct bias voltage for the input 88a. The control input 88b for the audio gate 88 is from the output of a NOR gate 99 having one input connected to the control input 87b of the audio gate 87 and the other input from a Q output of a set-reset flip flop 100 within the calling party forced disconnect detector 54, which will now be discussed.

The calling party forced disconnect detector circuit 54 is implemented with a bridge rectifier 121 having its AC nodes connected to the tip and ring wires of the pair 21a. The DC nodes of the bridge 121 are connected through a light emitting diode 122a of an optical isolator 122, to the collector of a DC amplifier transistor 123, and to an emitter resistor 124. The base of the transistor 123 is biased via a resistor 125 connected to the collector of the same transistor 123. A bypass capacitor 126 is connected between the base and the minus DC node of the bridge 121.

The optical isolator 122 includes a photo-transistor 122b having its emitter grounded and its collector connected to the $V_{cc}$ bus through a load resistor 127 as well as to an input 128a of a two input NAND gate 128. A capacitor 127a is connected from the input line 128a to ground. The other input 128b of the NAND gate 128 is connected through a pull up resistor 129 to the positive supply bus $V_{cc}$. A jumper wire 130 may be connected to ground the input 128b and thereby disable the calling party disconnect detector circuit 54 if so desired.

An output 128c of the NAND gate 128 is applied to a set input of the set-reset flip flop 100, already mentioned in connection with the audio gate circuitry 53. A reset input of the flip flop 100 is connected to the positive supply bus $V_{cc}$ through a pullup resistor 131 and bypassed to ground with a capacitor 132, together comprising a five second timer; it is also directly connected through a diode 133 to the Q output of the flip flop 77 via a line 134, which is the ACTIVATED LINE signal bus.

The Q output of the flip flop 100, already being identified as providing one input to the NOR gate 99 of the audio switch 53, is also connected to a reset input of a set-reset flip flop 135. A set input of the flip flop 135 is connected to the output of a two input NAND gate 136 via a line 137. One input to the gate 136 is the line 134. The other input of the gate 136 is a first unit QUEUE FIRST signal line QF1 from a QUEUE FIRST output decoder 138 which is an element associated with the queue memory unit 43 (FIG. 9). (The NAND gate 136 constitutes an implementation of the AND gate 55 functionally described in connection with FIG. 2). The line connection unit 40b for the second incoming line 21b would have its gate 136 connected to a second unit QUEUE FIRST line QF2 from the decoder 138, etc.

The QUEUE FIRST input of the NAND gate 136 includes a pull down resistor 139 to ground. The Q output of the flip flop 135 is connected by a line 141 to an emitter of a photo transistor 140b within an optical isolator 140 which also includes a light emitting diode 140a. An isolation diode 141a is connected between the line 141 and a DROPPED CALLS bus 141b.

The collector of the transistor 140b is connected through a load resistor 142 to the positive supply bus $V_{cc}$, and through a diode 142b to an input 143a of a two input NAND gate 143. A LINE DISCONNECT control signal from a gate 258 in the message delivery unit control and switching circuitry 180 (FIG. 10) is applied to the input 143a through a resistor 142a. The other input 143b of the gate 143 is connected through a pullup resistor 144 to the positive supply bus $V_{cc}$, to AC ground through a bypass capacitor 145 (which forms a one second timer), and to the ACTIVATED LINE bus 134 through a diode 146, the output of the NAND gate 143 is connected to a reset input of the flip flop 77.

Each line connection unit 40 also includes the instrument blinking control circuit 57. An AND/OR select gate 151 has one controlling input connected through an inverter 152 from the line 137. Another controlling input of the select gate 151 is connected to the ACTIVATED LINE bus 134. There are two alternatively selectable inputs to the gate 151. Clocking circuitry in the control unit 41 provides the source of the two pulsing signals. When both the lines 134 and 137 are enabled, the four pulse per second signal is supplied on an output line 151c of the gate 151. When the line 134 is alone enabled, the half pulse per second signal is at the output 151c.

The output 151c is applied through a resistor 153a to the base of a driver transistor 153 which has its emitter grounded and its collector connected through a resistor or to a light emitting diode 155a in an optical isolator 155. The diode 155a is also connected to the positive supply bus $V_{cc}$. A phototransistor 155b in the optical isolator 155 is in a Darlington connection with a power transistor 156 which in turn has its collector and emitter connected to plus and minus nodes respectively of a bridge rectifier 157. A bias resistor 158 is connected between the base and collector of the transistor 156.

A light interrupter triac 159 is connected in the LAMP wire between the KSU 22 and the telephone key instrument 23. The lamp wire is also connected in series with the AC nodes of the bridge 157 and a resistor 160. The AC bridge node in direct connection with the resistor 160 is also connected directly to the control element of the triac 159. The pulsing signals from the AND/OR select gate 151 are used to fire the triac to provide the alternating current signalling lamp voltage at the key 37 of the telephone instrument with two different flashing rates: a slow, half pulse per second rate when the incoming call on the line 21a is in the queue but not the first therein, and a fast, four pulse per second rate when the incoming call is first within the queue.

The line connection units 40 each include the attendant interruption detector 56 which terminates the operation of the unit 40 the moment the attendant comes onto the line. Referring again to FIG. 5, the attendant interruption detector 56 is paralleled across the A and A1 wires between the KSU 22 and the instrument 23. The series circuit includes a relay contact 80b of the relay 80 and AC nodes of a bridge rectifier 165.

The DC nodes of the bridge 165 are paralleled with the collector and emitter respectively of a transistor 166 and a series circuit including the light emitting diode 140a of the isolator 140 and two resistors 167 and 168. A bias resistor 169 connects between the base of the transistor 166.

By inspection it will be appreciated by those skilled in the art that when the attendant comes onto the line 21a, a zero voltage then occurring between the wires A and A1 is detected and sent to the gate 143 to reset the flip flop 77 and thereby drop the relay 80. The same operation occurs in connection with the functioning of the calling party forced disconnect detector 54. The description of the circuitry of each line connection unit 40 is now completed.

Message Delivery Unit, FIGS. 4 and 10

The message delivery unit 44 of the call answering and sequencing system 20 provides a short explanatory message to each calling party. In practice, an audio cartridge player of the type commonly used with automatic telephone answering equipment has been found to work with excellent results. An endless loop audio cartridge with a conductive foil stop band is utilized to store and reproduce the recorded announcement message. To assure compatibility and enable adaptation of any of the readily available cartridge cassette players with the system 20, the control electronics thereof will be described thoroughly, while the record and playback electronics will be explained only functionally, so as not to encumber this specification with material well known to those skilled in the art and not a part of the present invention.

Referring now to the block diagram of FIG. 4, the message delivery unit includes a control and switching circuit 180. Into this control and switching circuit 180 come a microphone 181 having a record mode preamplifier 182, a record/playback head 183, and stop posts 184 and 185 which sense the metallic signalling tape band attached to the endless loop recording tape in the cartridge. Out of the control and switching circuit 180 come erase circuitry 186 driving an erase head 187 (which operates only in the record mode), a playback preamplifier 188 which drives a power amplifier 189 and a loudspeaker 190 for monitoring the audio output of the message delivery unit. The loudspeaker 190, controls required to switch between the record and playback modes, controls to set playback levels, and the cassette tape handling mechanism are all preferably included as a part of the operator's console 46.

Turning now to the FIG. 10 schematic diagram of the control and switching circuitry 180 of the message delivery unit 44, it will be seen that the RING UP line 70d from the line connection units 40 is connected to a RING UP input node 201 having a resistor 202 to ground and a series resistor 203 leading to an input 204a of a Schmitt trigger 204 having a shunt capacitor 205 to ground. The RING UP signal from any one of the line connection units 40 enables the first input 204a of the Schmitt trigger 204.

The Schmitt trigger has a second input 204b connected to the output of a NOR gate 205. A first input 205a of the gate 205 is provided through a diode 206 and a shunt RC timing network of a resistor 207 and capacitor 208 from an output line 209 of a motor control flip flop 210. The input 205a is enabled whenever a tape drive motor 211 has been stopped for more than one second and the input 205a is low.

As already explained, the system 20 operates to queue incoming calls usually only if the attendant is already handling a call and is therefore unavailable. Thus an attendant busy circuit 212 is connected to the H and LG wires from the key service unit 22. If desired, this circuit may be disconnected in which event the system 20 will operate regardless of the availability of the operator.

The attendant busy circuit 212 includes a series resistor 213 and a light emitting diode 214a of an optical isolator 214. A phototransistor 214b of the isolator 214 has its emitter grounded and its collector connected through a series network of two resistors 215 and 216 to the positive supply bus $V_{cc}$. The node common to the resistors 215 and 216 provides an input to an inverter 217 and is shunted to ground by a timing capacitor 218 which operates to cancel short pulses occurring between the H and LG wires.

An output of the inverter 217 is taken through a series diode 219 to an input 220b of a two input NOR gate 220. The input 220b is shunted to ground with a capacitor 221. The gate 220 has another input 220a (which will be discussed below) and an output 220c which provides the ENABLE which is sent to each input 69b of the NOR gates 69 in all of the line connection units 40 (FIG. 5). The output 220c is also provided to the second input 205b of the NOR gate 205.

It will now be appreciated that the Schmitt trigger 204 will have an enabled output signal when three conditions obtain: a RING UP signal is present on the first input 204a, the tape drive motor 211 has been off for at least a second, and the attendant is on one of the lines of the system as detected by the circuit 212. The output of the Schmitt trigger 204 is taken through a pulse forming (differentiating) capacitor 222 to a $\overline{\text{RING UP START}}$ bus 223 having a pullup resistor 224 to the positive supply bus $V_{cc}$.

The motor control flip flop 210 comprises two latched NAND gates 225 and 226. The gate 225 has three inverting inputs 225a, 225b and 225c and an output which is the line 209. The output 209 of the gate 225 is also latch connected to an inverting input 226a of the gate 226, the output thereof being latch connected to the input 225c of the gate 225. The output line 209 of the gate 225 is connected through a resistor 227 to the base of a power switching transistor 228 having its emitter grounded and its collector connected through a motor control relay 229 to the positive supply bus $V_{cc}$. A bucking diode 230b is shunted across the armature of the relay 229 to protect the transistor 228. Contact 229a of the relay 229 controls the power supplied to the tape drive motor 211. When the output 209 of the gate 225 is high, the relay contact 229a closes and the tape drive motor begins to operate.

The input 225a of the gate 225 includes a manual "play" pushbutton switch 230, connected to ground and through a pullup resistor 231 to the $V_{cc}$ bus. A blocking series capacitor 232 and a resistor network of a series resistor 233 and a pullup resistor 234 also to the $V_{cc}$ bus are also connected to a node 230a of the switch 230. A manual "record" pushbutton switch 235 is also connected through a diode 236 to the switch node 230a.

The input 225b of the gate 225 is connected to a $\overline{\text{SCAN FINISHED}}$ bus 317 from the scanner circuit 310 (FIG. 6). The input 226b to the other gate 226 of the motor control flip flop 210 comes from a two input NAND gate 237 having a first input 237a from an inverter 238. Input to the inverter is provided by a pullup resistor 239 to the $V_{cc}$ bus and by a series resistor 240 connected to the stop post 184, already mentioned in connection with FIG. 4. The other stop post 185 is grounded. A capacitor 241 shunts the stop post 184 to ground, and another capacitor 242 shunts the input of the inverter 238 to ground.

In order for the output 209 of the gate 225 to go to a high level and thereby start the motor 211, either of two conditions must be present: the "play" switch 230 (or the "record" switch 235) must be closed or a $\overline{\text{SCAN FINISHED}}$ signal must come from the scanner 310. The "play" switch 230 and the "record" switch 235 are preferably mounted at the operator's console 46.

Output from the gate 226 of the motor control flip flop 210 is also provided as one input 245a of a two input NAND gate 245, the other input 245b being provided from the line 209 through a series network of a diode 246 and a resistor 247. Also connected to the input 245b is a pullup resistor 248 which is connected to the $V_{cc}$ bus and a shunt capacitor 249 to ground. The resistor 247, resistor 248 and capacitor 249 provide a delay of about one second charging and 0.05 second discharging. The input 245b is also connected to the input 237b of the NAND gate 237. The output 245c of the NAND gate 245 provides the $\overline{\text{TAPE END}}$ switching signal to the reset input of the audio switch control flip flop 93 of each line connection unit 40 (FIG. 5).

A lockout circuit is incorporated with the "record" switch 235 in order to lock the system 20 out of operation during tape recording of announcements. A line 250 from the "record" switch 235 connects to an inverter 251 through a diode 252 and to the input 220b of the NOR gate 220 through a diode 253. The input to the inverter 251 includes a pullup resistor 254 to the $V_{cc}$ bus and a normally closed grounding switch 255 which is opened, for example, when announce only operation of the system is desired (as on weekends when no attendant would be available). A pullup resistor 256 is also connected between the input 220b and the positive supply bus $V_{cc}$.

The line 209 is connected through a differentiating capacitor 257 to an input 258a of a two input NOR gate 258. The input 258a also includes a pullup resistor 259 to the $V_{cc}$ bus. An output line 258c of the gate 258 provides the LINE DISCONNECT signal to the gate 143 of each of the line connection units 40 (FIG. 5).

Control Unit 41, FIGS. 3, 6, 7, 8, 9, 11, 12

Figure 3:
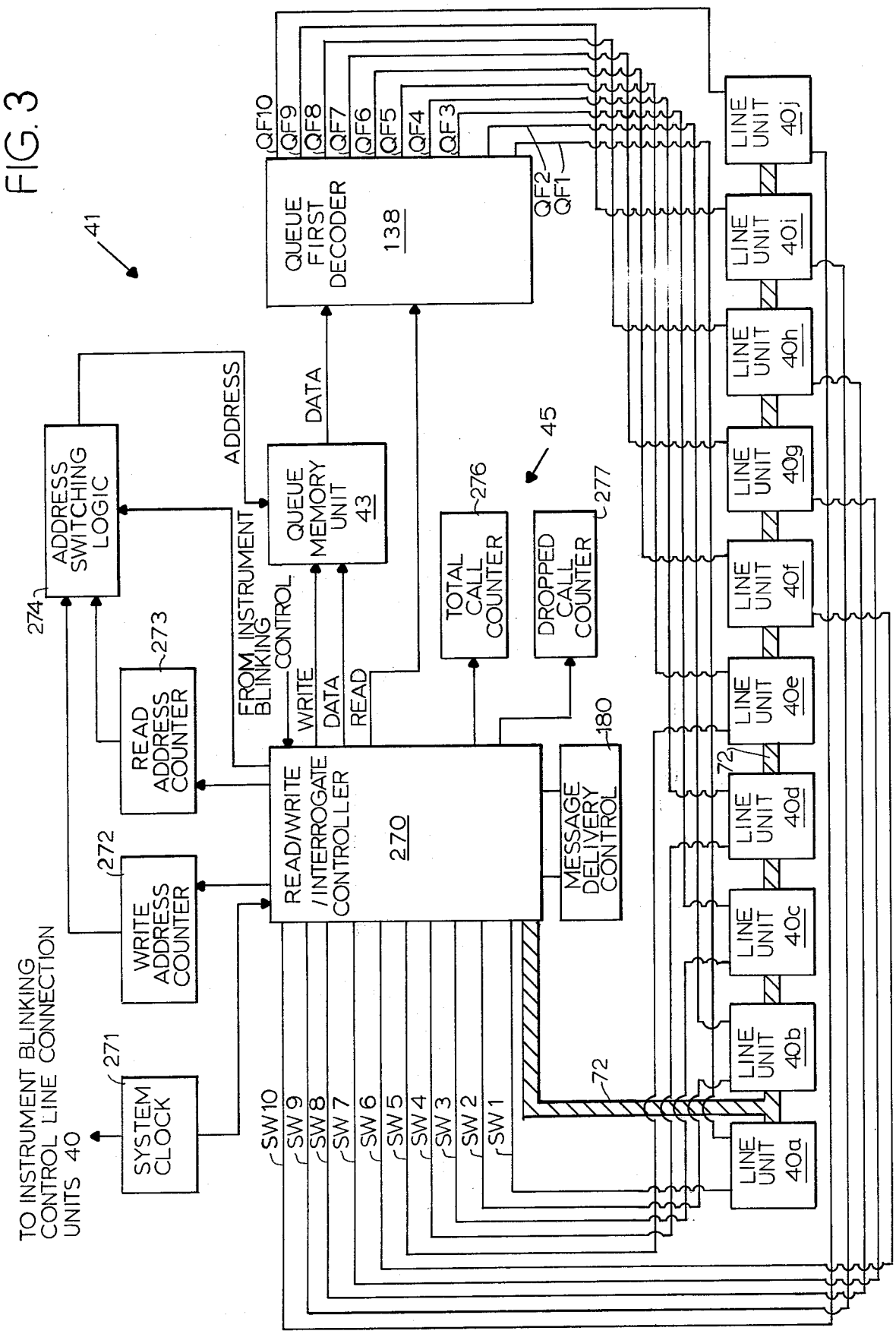
FIG. 3 is a detailed block diagram of the control and memory control connections with the line units of the system of FIG. 1.

Outline of Control Unit 41, FIG. 3

Referring now to the control unit block diagram FIG. 3, the control unit 41 includes a read/write/interrogate controller 270 (FIGS. 6 and 8) through which virtually all control signal paths flow. Connected to the controller 270 are a system clock 271 (FIG. 11); a write address counter 272 and a read address counter 273 (FIG. 7); address switching logic 274, the queue memory 43 and a queue first output decoder 138 (FIG. 9); the line connection units 40a–j (FIG. 5); the message delivery control 180 (FIG. 10); and, the statistical reporting unit 45 which in the system 20 preferably includes at least a total call counter 276 and a dropped call counter 277 (FIG. 12).

The read/write/interrogate controller 270 is connected by scanning lines SW1, SW2, SW3, SW4, SW5, SW6, SW7, SW8, SW9 and SW10 to the line connection units 40a, 40b, 40c, 40d, 40e, 40f, 40g, 40h, 40i and 40j respectively at the input 71b of the NAND gate 71 of each unit 40 (see FIG. 5). During the line scan operational mode the scanning lines sequentially enable each line connection unit 40, and those connection units having incoming unhandled calls respond to the controller 270 via the four bit binary line identifier bus 72 as previously described in connection with the line connection unit 40a of FIG. 5.

The controller also initiates a read-from-memory function via the read address counter 273 and the address switching logic 274. From information read from the queue memory unit 43 the controller 270 actuates the queue first output decoder 138 which in turn enables that particular line connection unit 40 which is first in the queue via a QUEUE FIRST (QF) signal. The QUEUE FIRST signal is sent to the particular line connection unit 40 via one of the ten lines QF1, QF2, QF3, QF4, QF5, QF6, QF7, QF8, QF9 and QF10 which are connected respectively to the line connection units 40a, 40b, 40c, 40d, 40e, 40f, 40g, 40h, 40i and 40j. It will now be appreciated that the data and control bus 42 shown connecting the control unit 41 to the line connection units 40 in FIG. 1 includes the four bit binary line identifier bus 72, the scanning lines SW1-10, queue first lines QF1-10, and other control lines already mentioned and to be discussed hereinafter.

System Clock 271, FIG. 11

The system clock 271 is depicted schematically in FIG. 11. Therein, a source of 60 hertz alternating current is applied (preferably at low voltage or through a decoupling capacitor which is not shown) to an input node 281. A voltage divider consisting of a shunt resistor 282 to ground and a series resistor 283 delivers the 60 hertz signal to a voltage limiter including a diode 284 connected to the positive supply bus $V_{cc}$, a diode 285 connected to the paralleled inputs of a NAND gate 286 functioning as a Schmitt trigger and a capacitor 287 to ground. A resistor 288 is connected from the input of the gate 286 to ground. Output from the inverter 286 is applied to the clock (C) input of a down counter 289 having its reset (R) input grounded so as to be free running.

A thirty hertz CLOCK output 290 is provided at the Q1 output of the counter 289. A four hertz (actually 3.75 hertz) output 291 is taken at the Q4 output of the counter 289 and provided to a first input of a two input NOR gate 292. The other input of the gate 292 is from a grounding switch 293 and a pullup resistor 294 to the positive supply bus $V_{cc}$. The gate 292 is enabled when the switch 293 is closed, and it functions to switch the system 20 into the announce only mode for, e.g., weekend operation in the same manner as the switch 255 discussed in connection with FIG. 10, above. The four hertz signal is taken from the gate 292 on an output line 295 which is connected to each AND/OR select gate 151 of the line connection units at its input 151b (FIG. 5).

A half Hertz signal (actually 0.46875 hertz) is taken from the Q7 output of the counter 289 through a capacitor 296 and a series resistor 297 to a single paralleled input of a Schmitt trigger 298 having a shunt resistor 299 to ground. An output of the Schmitt trigger 298 is inverted by an inverter/driver 300 and then is distributed via a line 301 to each AND/OR select gate 151 at the input 151a thereof.

Figure 8:
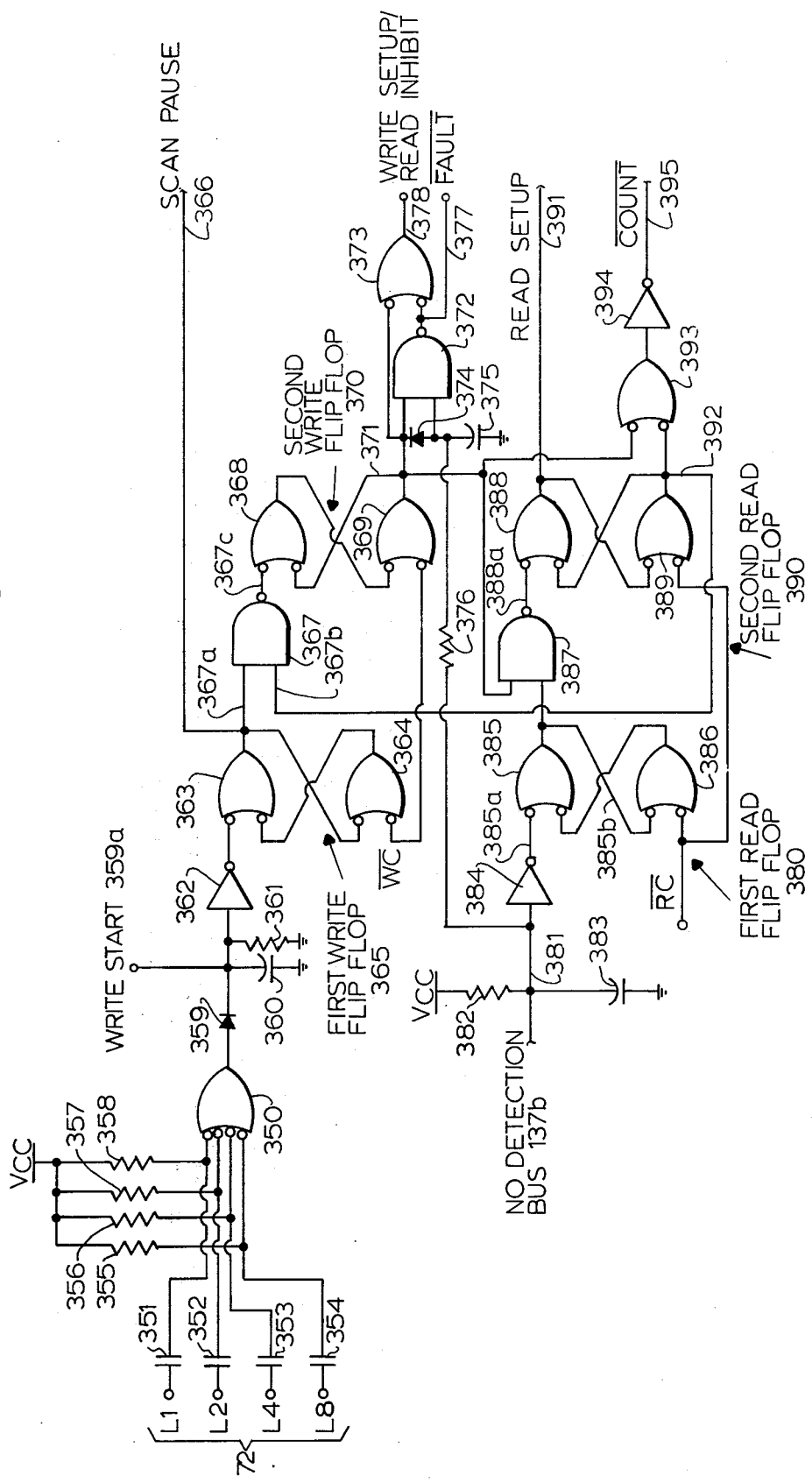
FIG. 8 is a detailed schematic logic diagram of a read/write control element of the control unit shown in FIG. 3.

Read/Write/Interrogate Controller 270, FIGS. 6 and 8

Referring first to FIG. 6, the controller 270 includes a scanner circuit 310. The $\overline{\text{RU START}}$ signal generated at the output 223 of the Schmitt trigger 204 (FIG. 10) in response to a connection unit 40 having an incoming call (FIG. 5) is supplied to the scanner 310 as an input signal to an inverter 311. An output 311a from the inverter 311 provides an input to a two input NOR gate 312, the output 312a of which in turn provides one input to a two input NOR gate 313.

An output line 313a of the gate 313 is connected to an enable (E) input of a four stage binary scanning counter 314. The counter has a clock (C) input connected to the 30 hertz clock line 290 and a reset (R) input grounded. The counter has four binary output lines 314a, 314b, 314c and 314d which are connected as four input lines to a 16 output line decoder 315. The first four outputs of the decoder 315 are not used. The fifth through the fourteenth outputs provide the scanning lines SW1, SW2, SW3, SW4, SW5, SW6, SW7, SW8, SW9 and SW10 which respectively connect to the gates 71 of the line connection units 40a, 40b, 40c, 40d, 40e, 40f, 40g, 40h, 40i and 40j.

The fifteenth output of the decoder 315 is passed through an inverter 316 to provide a $\overline{\text{SCAN FINISHED}}$ line 317 which may be utilized either to initiate other scanner circuits hooked in tandem with the scanner circuit 310 (as in an expanded system capable of handling e.g. forty or as many as one hundred sixty separate incoming telephone lines) or to initiate the tape drive motor 211. The sixteenth and final output of the decoder 315 is inverted by an inverter 318 having an output line 319 which provides a SCAN LINE signal to other circuits of the controller 41 and provides the other input of the nor gate 312. The connection of the line 319 to the gate 312 disenables the enable input of the counter 314 once the decoder has swept across the lines SW1 through SW10 (and all other tandem connected scanners have scanned their line connection units 40) and has reached the sixteenth output whereupon the scanner circuit stops scanning and waits for the next $\overline{\text{RU START}}$ signal to occur.

Returning for a moment to FIG. 5, it will be seen that the ACTIVATED LINE bus 134 is connected through an isolating diode 134a to a NO LINES HOLDING bus 134b which is commonly connected to all line connection units 40. Turning now to FIG. 7, the $\overline{\text{NO LINES HOLDING}}$ bus 134b is connected to node 320 having a shunt resistor 321 to ground and providing one input 322a of a two input NOR gate 322 having its other input 322b connected to an output of a two input NAND gate 323 having its inputs connected to a predetermined combination of outputs of the counter 272. The gate 323 resets the counter 272 when the highest number memory address has been reached. The output 322c of the gate 322 is connected to a reset (R) input of the write address counter 272. The counter 272, a seven stage binary counter, has six connected output lines 324, 325, 326, 327, 328 and 329 which are connected to queue memory circuit elements shown in FIG. 9.

The node 320 receiving the $\overline{\text{NO LINES HOLDING}}$ signal is also connected to a first input 330a of a two input NOR gate 330 which is latch-connected to another similar gate 331 to provide a read address reset flip flop 332. An output line 333 from the gate 331 is provided as one input 334a of a two input NOR gate 334. The other input 334b of the gate 334 is from an output of a two input NAND gate 335, having its inputs connected to a predetermined combination of outputs of the counter 273. The gate 335 resets the counter 273 when the highest number memory address has been reached.

An output 334c is connected to a reset (R) input of the read address counter 273, which, like the write counter 272, is a seven stage binary counter with its first six stages connected to output lines 336, 337, 338, 339, 340 and 341. The output lines 336–341 are also connected to circuit elements shown in FIG. 9. When the $\overline{\text{NO LINES HOLDING}}$ bus 134b goes to a high level, the write counter 272 becomes enabled to count in accordance with clocking signals received at its clocking (C) input thereof. After the first write into memory operation is completed, the read counter 273 then becomes enabled. A write increment (WINC) signal from a write increment bus 348 clocks the write counter 272 while a read increment (RINC) signal from a read increment bus 402 clocks the read counter 273. The generation of the read increment and write increment control signals, and others as well will not be considered.

Turning to FIG. 8, the binary line identifier bus 72, including lines $\overline{\text{L1}}$, $\overline{\text{L2}}$, $\overline{\text{L4}}$ and $\overline{\text{L8}}$ is connected to four inputs of an inverting input NAND gate 350 through differentiating capacitors 351, 352, 353 and 354. The four inputs are also connected to the positive supply bus $V_{cc}$ through four pullup resistors 355, 356, 357 and 358 respectively. Any one of the lines $\overline{L1}$, $\overline{L2}$, $\overline{L4}$ and $\overline{L8}$ and any combination thereof momentarily going to a low level activates the gate 350 and causes its output to go to a high level which is passed through a diode 359 to a WRITE START node 359a to which a network of a capacitor 360 and a resistor 361 connected to ground, and an inverter 362 connected to an input of a two inverted input NAND gate 363.

The gate 363 is latch-connected to a like NAND gate 364 to form a first write flip flop 365. The high level signal from the output of the gate 350 sets the first write flip flop and provides a low output at the gate 363 which provides a SCAN PAUSE bus 366.

Turning back to FIG. 6, the SCAN PAUSE bus 366 is connected as another input to the NOR gate 313. Consequently, when the SCAN PAUSE bus 366 is driven high as a result of a detected incoming call via the binary line unit identifier bus 72, the scanning counter 314 is thereupon disenabled and scanning immediately ceases.

Returning to FIG. 8, the SCAN PAUSE bus 366 is connected as one input 367a of a two input NAND gate 367. The other input 367b of the gate 367 comes from an output of a second read flip flop 390 to be discussed later. When the controller 41 is not in the read mode, the input 367b is high, and a high level on the other input 367a drives the output 367c of the gate 367 to a low logic level. The output 367c is connected as one input of an inverting two input NAND gate 368 which is latch-connected to a like NAND gate 369 to form a second write flip flop 370. The low output 367c sets the second write flip flop which then provides a low level output line 371 at the output of the gate 369.

The output line 371 is supplied as one input of a two input NAND gate 372 and as one input of a two inverting input NAND gate 373. The other input of the NAND gate 372 includes a timing circuit comprising a diode 374 across both inputs of the gate 373, a capacitor 375 to ground, and a series resistor 376 leading from the NO DETECTION bus 137b (FIG. 5).

An output 377 from the gate 372 provides a $\overline{\text{FAULT}}$ bus (for a fault circuit 435 to be discussed later) and is the other input for the gate 373. An output 378 from the gate 373 provides a WRITE SETUP/READ INHIBIT line which enables the write mode to be set up in the system 20 and simultaneously inhibits the read mode.

Returning for a moment to the schematic diagram of the line connection unit 40a (FIG. 5), an isolation diode 137a is connected to the bus 137 to form a NO DETECTION bus 137b. The NO DETECTION bus is high unless the ACTIVATED LINE bus 134 is high and the unit 40a is receiving a QUEUE FIRST signal in which event the output bus 137 of the NAND gate 136 is driven to a low state. The NO DETECTION bus 137b is also low when no lines are activated because of flip flop 332 and diode 407.

Continuing with the description of the circuitry shown in FIG. 8, the NO DETECTION bus 137b is connected to an input node 381 to which a pullup resistor 382 and a bypass capacitor 383 are also connected. The resistor 376 is also connected to the node 381 which is passed through an inverter 384. An output of the inverter 384 provides one input 385a to a two inverting input NAND gate 385 which is latch-connected with a like NAND gate 386 to provide a fist read flip flop 380. An output 385b of the latched gate 385 provides one input of a two input NAND gate 387 in which its other input is conconnected to the line 371. An output of the gate 387 is provided as one input 388a to a two inverting input NAND gate 388 which is latch-connected with a like NAND gate 389 to provide a second read flip flop 390. An input of the gate 389 is connected with a similar input of the gate 386, and these inputs receive a low read clear ($\overline{RC}$) signal from a line 405 shown in FIG. 6, which will be described shortly.

An output line 391 from the gate 388 provides a READ SETUP control signal bus. An output line 392 from the gate 389 is connected to the input 367b of the NAND gate 367 just before the second write flip flop 370. The line 392 is also connected to an input of a two inverting input NAND gate 393, its other input being connected to the line 371. An output of the gate 393 is inverted by an inverter 394 which provides as its output a $\overline{\text{COUNT}}$ conrol bus 395 which enables a read/write sequence counter 396 (FIG. 6).

In FIG. 6 the sequence counter 396 has its reset (R) input connected to the $\overline{\text{COUNT}}$ bus 395, and its clock (C) input connected in parallel with the clock input of the scanning counter 314 to the 30 hertz clock line 290. The sequence counter 396 includes two binary stages having two outputs 396a and 396b. The outputs 396a and 396b are connected to the first two of four binary inputs of a binary to decimal decoder 397. A third input of the decoder 397 is connected to the READ SETUP bus 391 and a fourth input is grounded. Six outputs of the decoder 397 are utilized: the first output provides the write increment (WINC) bus 398; the second output provides a WRITE line 399; the third output is inverted as an inverter 400 and provides a low going write clear ($\overline{\text{WC}}$) bus 401 which is connected to reset both of the write flip flops 365 and 370 (FIG. 8); the fourth output provides a read increment (RINC) bus 402; the fifth output provides a READ line 403; and, a sixth output is inverted by an inverter 404 and then provides a low logic level read clear ($\overline{\text{RC}}$) control bus 405 which is connected to reset the read flip flops 380 and 390 (FIG. 8).

In FIG. 7, the WRITE line 399 is connected through an inverter 406 to a reset input of the NAND gate 331 of the read address reset flip flop 332. The NO DETECTION bus 137b is connected to the output line 333 of the read address reset flip flop 332 through a diode 407.

Queue Memory Unit 43, FIG. 9

The queue memory unit 43 is shown in detail in the schematic logic diagram of FIG. 9. In overview, the memory unit 43 includes a write address/read address selector 420, an address decoder 421, three eight bit by four word CMOS random access memories 422, 423, and 424 which are wired in tandem to form a single twelve byte memory stack, a four bit write mode identifier bus selector 425 having a two input NAND gate 426 connected at its output disconnect (OD) control input, the ten line QUEUE FIRST output decoder 138 (already mentioned in connection with the line connection unit 40a above), an output latch 427 comprising two double inverting input NAND gates 428 and 429 in a latch interconnection, with a reset input of the gate 428 being connected from an output of a NAND gate 430, and a set input of the gate 429 being connected to an output of an inverter 431.

A FAULT circuit 435 is included within the memory unit 43 to restore data to the memory chips 422, 423, 424 and any other memories that may be in tandem in an expanded system in the event of a power failure and consequent loss of memory content. The fault circuit includes a six stage binary counter 436, a binary to decimal decoder 437, eight line inverters 438, 439, 440, 441, 442, 443, 444 and 445, and an eight bit fault circuit selector 446. The selectors 425 and 446 both comprise parallel inverters, each having an output disconnect (OD) feature.

The lines $\overline{L1}$, $\overline{L2}$, $\overline{L4}$ and $\overline{L8}$ of the binary line unit identifier bus 72 are each held at a high logic level by pullup resistors 447, 448, 449 and 450, respectively. The lines $\overline{L1}$, $\overline{L2}$, $\overline{L4}$ and $\overline{L8}$ are supplied as data inputs to the identifier bus selector 425. The inhibit control input (I) of the selector 425 is held low by a ground connection. The NAND gate 426 connected to the output disconnect control input (OD) of the selector 425 has two inputs, one connected to the SCAN line 319 and the other connected to the WRITE SETUP/READ INHIBIT line 378. When both of the lines 319 and 378 are at a high logic level, four output lines L1, L2, L4 and L8 of the selector are connected to the input lines $\overline{L1}$, $\overline{L2}$, $\overline{L4}$ and $\overline{L8}$. The selector 425 is enabled during the write mode of the system 20 to pass line connection unit identification data to data inputs (I) of the memories 422, 423, 424. The SCAN line 319 is looped through the selector 425 twice to eliminate inversion and provide a strobe control signal line 451 to an input of the NAND gate 430 of the output latch 427. The strobe line 150 resets the output latch 427 during each write mode operation of the system 20.

Each of the memories 422, 423, 424 (and others not shown which may be connected in tandem) is selected by the decoder 421. Ten output lines from the decoder 421 are utilized: 452, 453, 454, 456, 457, 458, 459, 460, 461. The first three lines 452, 453, and 454 are connected to chip inhibit (CI) control inputs of the memories 422, 423 and 424 respectively. The seven remaining lines 455–461 would each be connected to chip inhibit inputs of seven other memories of an expanded 40 line system, to enable one of the ten memories in accordance with the memory chip identification address decoded by the decoder 421. Four binary lines 462, 463, 464 and 465 enter the decoder 421 from the write address/read address selector 420. Two other lines 466 and 467 are parallel connected to the address zero (A$\phi$) and address one (A1) inputs of the memories 422, 423, 424 (and would be connected to the A$\phi$ and A1 inputs of the other seven memories as well).

The write address/read address selector 420 selects between the write address counter lines 324, 325, 326, 327, 328 and 329 and the read address counter lines 336, 337, 338, 339, 340 and 341 (FIG. 7) in accordance with enabling signals from the WRITE SETUP/READ INHIBIT line 378 which is connected to a write (W) input of the selector 420 and the read setup line 391 which is connected to a read (R) input thereof.

The WRITE line 399 (from the decoder 397 of FIG. 6) is parallel connected to the write (W) inputs of the memories 422, 423 and 424 (and to the write inputs of any other memories as well).

In addition to the write input of the selector 420, the WRITE SETUP/READ INHIBIT line 378 is parallel connected to the read inhibit (RI) inputs of the memories 422, 423, 424 (and in similar connection to any other memories of the expanded system).

Each memory chip includes eight input (I) lines and eight output (O) lines. Four input and corresponding output lines are parallel connected to the lines L1, L2, L4 and L8 while the remaining four input and output lines are parallel connected to four memory board lines MB1, MB2, MB3 and MB4. In accordance with the preferred architecture of an expanded forty line system, three other memory boards would be provided, two boards having two memory chips, and the other board having three memory chips, to provide a total of ten tandem connected memories.

The four line unit identifier lines L1, L2, L4 and L8 are connected to the four binary inputs of the output decoder 138. Ten outputs of the decoder 138 are used, with each output line QF1, QF2, QF3, QF4, QF5, QF6, QF7, QF8, QF9 and QF10 being connected to its corresponding line connection unit 40a, 40b, 40c, 40d, 40e, 40f, 40g, 40h, 40i and 40j as shown in FIG. 3. The decoder 138 passes the QUEUE FIRST control signal to the line connection unit having the oldest unattended incoming call found within the entire memory stack.

The QUEUE FIRST output decoder 138 latches the binary information on the lines L1, L2, L4 and L8 whenever a strobe (S) signal is received from the READ line 403. The QUEUE FIRST output of the decoder 138 is inhibited during the read increment (RINC) operation by an inhibit (I) signal received from the output of the gate 429 of the output latch 427 on a line 468.

The control line 451 is electrically connected to the memory board selector line MB1 at a connection point 469. The line 451 would be connected to another memory board line MB2, MB3 and MB4 in the case of each of the other memory boards proposed for inclusion in an expanded forty line system. The latch 427 latches when the memory board selector line (MB1) to which it is connected is high during a strobe signal on the READ line 403, thereby enabling (not inhibiting) the QUEUE FIRST output of the decoder 138.

Fault Circuit 435

As previously mentioned a fault circuit 435 is included within the system 20 to insure that in the case of a power failure and loss of all data in memory, the system will restore itself and arbitrarily reestablish a queue of all incoming calls then awaiting handling by the attendant or attendants.

The fault circuit 435 begins with the counter 436 having a clock input (C) connected to the read increment (RINC) bus 402, and having a reset input (R) connected to the $\overline{FAULT}$ bus 377 (from FIG. 8). Six binary counter stages in the counter are used, and six binary output lines 481, 482, 483, 484, 485 and 486 lead from the counter 436. The first four lines 481, 482, 483 and 484 are input directly to the inverters 438, 439, 440 and 441 while the remaining two lines 485 and 486 are connected as the first two inputs of the BCD to decimal decoder 437. The two high order (4, 8) BCD inputs of the decoder 437 are grounded. The decoder 437 functions as a two bit binary to radix four decoder and thus provides four input lines 487, 488, 489 and 490 which are connected as inputs to the four remaining inverters 442, 443, 444 and 445.

The fault selector 446 receives as inputs the outputs of the eight fault inverters 438–445 and has eight outputs which are connected to the eight bit data bus comprising the lines L1, L2, L4, L8, MB4, MB3, MB2 and MB1. The output disable (OD) input of the selector 446 is connected to the $\overline{FAULT}$ bus 377, and the inhibit (I) control input of the selector 446 is grounded.

Statistical Reporting Unit 45, FIG. 12

The statistical reporting unit 45 of the system 20, shown in FIG. 12, includes basically two counters, a total calls counter 276 and a dropped calls counter 277. The total calls counter circuit 276 starts with its input connected to the WRITE line 399. An isolation diode 501, a capacitor 502 and a resistor 503 both shunted to ground to form an RC timing network to stretch the input pulse sufficiently to actuate an electromechanical counter 511. The diode 501, capacitor 502 and resistor 503 are also connected to the input.

The WRITE line input signal is passed through an inverter 504, another inverter/driver 505, and a series resistor 506 to a base input 507 of a Darlington connected transistor pair 508 having the emitter 509 grounded and the collector 510 connected through the electromechanical TOTAL CALLS counter 511 to the positive supply bus $V_{cc}$ through a current limiting resistor 512. A feedback capacitor 513 is connected between the collector 510 and the base 507 of the Darlington transistor pair 508, and a protection diode 512a is connected across the counter 511 to protect the transistor pair 508.

The WRITE line 399 provides the input signal for the total calls counter 276. Each time the WRITE line 399 is enabled to write a new connection unit identification into the memory stack, the line 399 also increments the total calls counter 276 by one count.

The dropped calls counter 277 follows much of the same circuitry used in the total calls counter 276. Refferring for a moment to FIG. 5, the diode 141a leads from the line 140 to provide the DROPPED CALLS control line 141b which is parallel connected with all of the line connection units 40. Turning now to FIG. 12, the DROPPED CALLS line 141b is connected to an input 514a of a two input NAND gate 514. The input 514a also includes a capacitor 515 and a resistor 516 shunted to ground. The gate 514 includes another input 514b which is connected through a pullup resistor 517 to the positive supply bus $V_{cc}$. A switch 518 grounds the input 514b during weekend operations when the system 20 is in an announce only mode.

The switch 518 may be mechanically linked to, or part of, the switches 255 (FIG. 10) and 293 (FIG. 11) which are also related to the announce only function.

An output 514c of the gate 514 is passed through an inverter/driver 519 and a series resistor 520 to a gate 521 of a Darlington transistor pair 522, having an emitter 523 grounded and a collector 524 connected through an electromechanical counter 525 and the resistor 512 to the $V_{cc}$ bus. A feedback capacitor 526 is connected from the collector 524 to the base 521, and a protection diode 526a is paralleled across the counter 525. The node common to the counters 511 and 525 is bypassed with a bypass capacitor 527 to ground.

Operation of the Sequencing System 20

Scan Interrogation Timing, FIG. 13

FIG. 13 illustrates the operation sequence for the scan interrogation function. It is assumed that the fourth incoming telephone line 21d has an incoming call, hereinafter referred to as a "ring up", although any other or a combination of other lines could have rung up. It is further assumed that the $\overline{\text{RU START}}$ pulse on the line 223 which initiates the scan interrogation sequence, occurs sometime between clock pulses arbitrarily labeled 0 and 1. The SCAN line 319 immediately goes high causing the output of the NOR gate 312 to go low and allow the enable input E of the scanning counter 314 to remain enabled through the output of the NOR gate 313 which goes high. Nothing then occurs until the fifth clock pulse when line SW1 goes high, scanning line one. On the sixth clock pulse, line 2 is scanned when SW2 goes high. On the seventh clock pulse, line 3 is scanned. On the eighth clock pulse line 4 is scanned.

Since line 4 was ringing up, a write operation (FIG. 15) is activated, causing the SCAN PAUSE line 366 to go high which causes the output of NOR gate 313 to go low and immediately stop the scanning counter 314 from counting. The write operation consumes three clock pulses, during which time the scan interrogation operation pauses.

On the eleventh clock pulse the write operation is complete and the SCAN PAUSE line 366 then goes low, allowing the output of the NOR gate 313 to go high and once again enabling the scanning counter 314 which resumes counting. At this point, the fifth line 21e is scanned. Likewise the sixth line through the tenth line are scanned with clock pulses 12 through 16. Clock pulse 17 causes the $\overline{\text{SCAN FINISHED}}$ line 317 to go low and either starts a scan operation on another memory board if more than ten lines exist, or activates the $\overline{\text{MOTOR START}}$ line 225b if scanning of all of the incoming telephone lines 21 is completed. On clock pulse 18, the SCAN line 319 goes low causing the output of NOR gate 312 to go high which causes the output of NOR gate 313 to go low which causes the scanning counter 314 to stop counting until another $\overline{\text{RU START}}$ pulse appears on the line 203.

Individual Line Timing, FIG. 14

In the operation sequence, FIG. 14, for each individual line unit 40, it is assumed that the third line 21c rang up, although the sequence would be similar for any line. When a ring voltage appears on the tip and ring wires of line 21, node 69a goes low, after a delay of about one second. This causes the line 71a and the RING UP line 72c to go high. The RING UP signal initiates a scan interrogation sequence which causes the flip flops 77 and 93 to be set. Since the third line was the one that rang (two diodes 73 and 74 from line 71c to the line 72 being connected for line 21c), lines L1 and L2 go low, signalling to the control 270 that a write operation is required.

The Q output of flip flop 93 causes the bilateral gate 87 to turn on and bilateral gate 88 to turn off, causing the primary winding of the telephone line transformer 85 to be connected to the audio output of the amplifier 189 in the system 20. The Q output of flip flop 77 causes the LINE ACTIVATED line 134 to go high, and this event biases the transistor 79 on and operates the relay 80 which causes the contact 80a to close and terminate the telephone line through the resistor 84 and transformer 85, and also to connect the calling party forced disconnect detector 54 across the tip and ring wires of the particular telephone line 21c. Also the relay 80 causes the contact 80b to close and trip the A and A1 circuitry in the KSU 22 by connecting the attendant disconnect circuit 56 in series with these leads.

The LINE ACTIVATED line 134 also causes a one second timer composed of the diode 146, capacitor 145 and resistor 144 to be started. The timer will prevent the flip flop 77 from being reset furing the first one second of its operation. In addition the LINE ACTIVATED line 134 causes a five second timer, composed of the diode 133, the capacitor 132 and the resistor 131, to be started. The timer will prevent the flip flop 100 from being set by a calling party forced disconnect pulse, for five seconds from the moment the flip flop 77 was set.

The LINE ACTIVATED line 134 causes an input of the AND/OR SELECT gate 151 to go high and gate through a 1/2 pulse per second signal to the transistor 153 controlling the lamp interruptor 57 thereby causing the telephone instrument lamps to wink off once every two seconds. The LINE ACTIVATED line 134 also enables the NAND gate 136. When this line reaches the queue first status, the line 137 will go low, sending a low impulse into the NO DETECTION line 137b. Also this event will cause the inverter 152 to enable another input on the AND/OR SELECT gate 151 and allow the 4 pulse per second signal to make the lamp interruptor circuit 57 interrupt the telephone instrument lamps at the queue first rate.

When the tape drive has finished playing out the recorded message, a short TAPE END pulse will appear on line 245c to reset the flip flop 93 which will cause the bilateral gates 87 and 88 to disconnect the transformer 85 from the tape drive audio source 44 and connect it to the music source line 96. The NO DETECTION line 137b will also cause the set input of the flip flop 135 to go low and this flip flop will be set if the reset input happens to be high.

If the caller had hung up, the calling party forced disconnect detector 54 would have caused flip flop 100 to be set and this would have made the reset input of flip flop 135 high. Also, the Q output of the flip flop 100 would have enabled the NOR gate 99 and thus have caused it to disable the control input of the bilateral gate 87 and this event would have disconnected this third line 21c from the music source line, thereby reducing any possibility of crosstalk from the now hung up line 21c into the music line 96.

If the caller had hung up and the line 21c was in queue first status, then the output line 140 from flip flop 135 would go high, causing the emitter and collector of the transistor 140b to go high, thereby enabling the NAND gate 143 and causing the flip flop 77 to disconnect the line unit 40 from the telephone line 21c. Line 140 also places a high level impulse on the DROPPED CALLS line 140d.

If the attendant takes the call on that line, the transistor 140b turns off and causes the line unit 40c to disconnect from the telephone line 21c in the same manner. When the line connection unit 40c disconnects from the telephone line 21c, the ACTIVATED LINE output 134 goes low and resets both the one second and the five second timers and causes the AND/OR SELECT gate 151 to stop winking the lamps on the telephone instrument 23.

Write Timing, FIG. 15

In this operational sequence illustrated in FIG. 15, it is assumed that the third line 21c on the first board is to be written into the memory stack although any other line on any other board could be written in the same manner. We will arbitrarily label the clock pulse which scanned line 21c on the first board 95 as pulse "0". At the time of clock pulse 0, line $\overline{L1}$ and $\overline{L2}$ go low which causes the WRITE START node 359a to pulse high once and set the first write flip flop 365. This flip flop 365 sends a SCAN PAUSE signal back to the scan interrogation system via the line 366 causing it to stop scanning.

At this point it is assumed that the system 20 was not reading from the memory stack. If it were, the write operation sequence would pause until the read sequence was finished. Since there is not a read operation in progress, the second write flip flop 370 is set.

The output 371 of this flip flop second write 370, with the help of the diode 374 causes both inputs of the NAND gate 372 to go low and consequently its output 377 to go high, discontinuing any operation of the fail-safe fault recovery system. This output 371 also causes one input of NAND gate 373 to go low and therefore the WRITE SETUP/READ INHIBIT line 378 to go high. This line inhibits the outputs from the memories, causes information about line and board numbers to be gated into lines L1, L2, L4, L8, MB4, MB3, MB2, and MB1, and also gates the write address counter 272 outputs into the memory chip decoder 421 and memory address inputs. Output line 371 also causes one input of the NAND gate 393 to go low, causing the output of the inverter 394 to go low, causing the $\overline{\text{COUNT}}$ line 395 to go low. This lowers the reset input of the read/write sequence counter 396 to ground potential enabling the counter 396 to begin counting.

On the clock pulse 1, the write increment (WINC) line 398 goes high, incrementing the count of the write address counter 272 by one count. On the clock pulse 2, the WRITE line 399 goes high causing one of the memories to write the information present at its inputs. Clock pulse 3 causes the write clear ($\overline{\text{WC}}$) bus 401 to go low resetting both write flip flops 365 and 370 and thereupon concluding the write operational sequence.

Read Timing, FIG. 16

In the read operational sequence, illustrated in FIG. 16, it is assumed that the NO DETECTION line 137b goes high during clock pulses arbitrarily labeled 0 and 1. This event occurs, e.g. when the attendant connects to the line to handle the call. Also it is assumed that there is no write operation in progress. When the NO DETECTION line 137b goes high, this causes the first read flip flop 380 to be set. If there were a write operation in progress at this time, the read operational sequence would not pause until the write operation was finished. However, since this is not the case, the second read flip flop 390 is also set immediately. This causes the read/write sequence counter 396 to start counting. Also this causes the READ SETUP line 391 to go high. This line gates the outputs 336-341 of the read address counter 273 into the memory chip decoder 421 and memory address inputs. It also causes the third binary input of the read/write sequence decoder 397 to go high.

Clock pulse 1 causes the read increment RINC line 402 to go high, causing the read address counter 273 to increase its count by one and also causing the output latch 427 on all of the memory boards to reset. Clock pulse 2 causes the READ line 403 to go high. This shifts the information being read out from the memory on the L1, L2, L3 and L4 lines into the queue first decoders 138 on all of the memory boards. Also this causes the output latch 427 on the board number stored in memory on lines MB1, MB2, MB3 and MB4 to be set, thereby enabling the outputs of the queue first decoder 138 on that particular board. Clock pulse 3 causes the $\overline{\text{RC}}$ line to go low causing both read flip flops 380 and 390 to be reset. Thus, the system 20 has now sequenced to the next oldest call stored in the memory stack, and the line unit 40 having that incoming call is sent the QUEUE FIRST signal.

Figure 17:
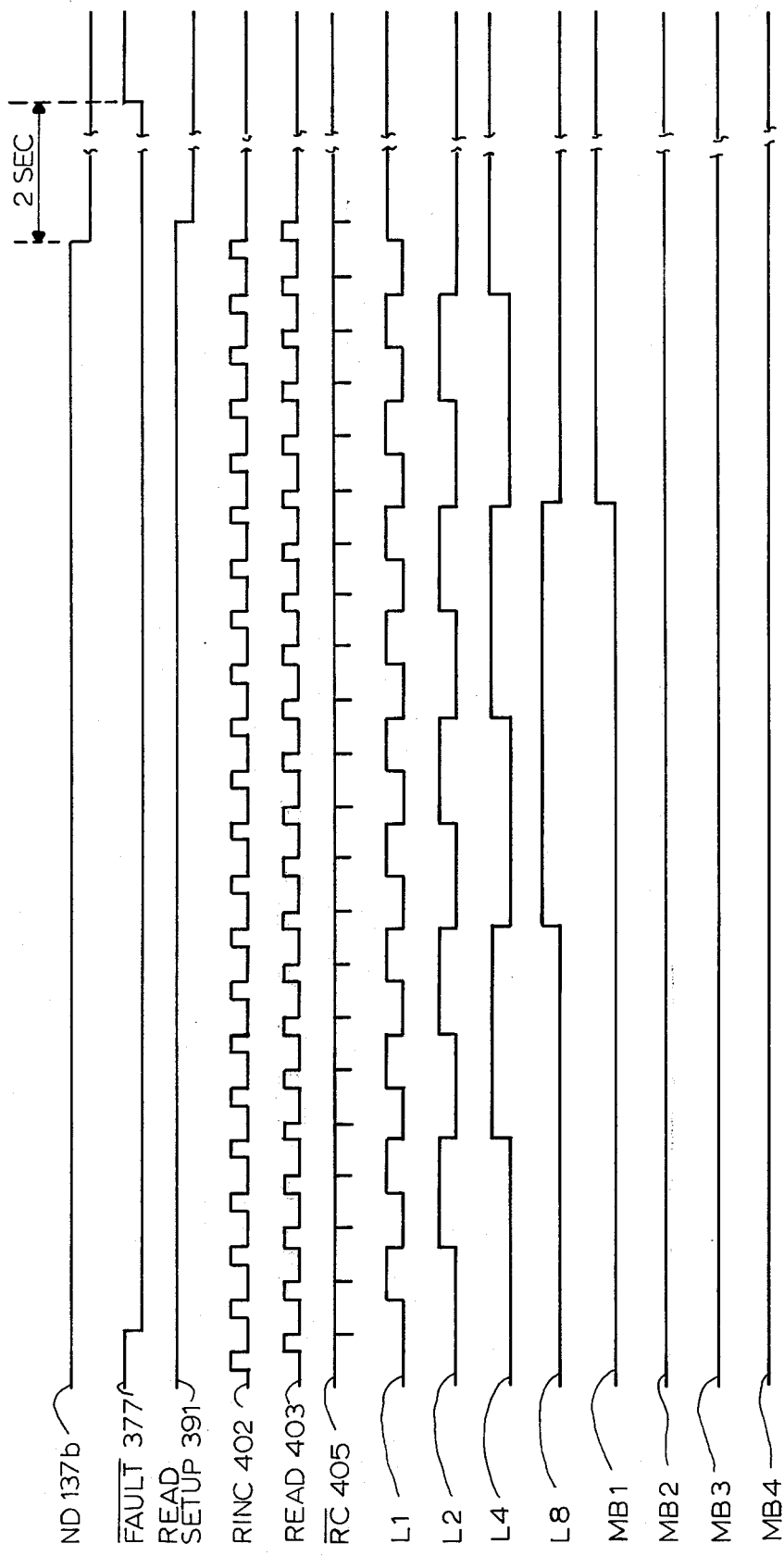
FIG. 17 is a timing diagram of the failsafe fault correction operation of the queue memory unit shown in FIG. 9.

Fault System 435 Timing, FIG. 17

Operation of the fault system 435 becomes initiated whenever the system 20 reads its queue memory unit 43 for more than two seconds and does not find a priority line even though lines are being held in the system. This situation might arise after a power failure or in the event that the system 20 is inadvertently turned off or when the system 20 is first turned on in the morning (assuming it had been turned off the night before rather than being placed into the announce only mode).

After the two seconds pass, the $\overline{\text{FAULT}}$ line 377 goes low. This event grounds the reset input to the counter 436 and thereby enables it to count. The $\overline{\text{FAULT}}$ line 377 also allows the inverter 446 to connect into the memory input/output lines L1, L2, L3, L4, MB4, MB3, MB2 and MB1. At the same time, the $\overline{\text{FAULT}}$ line 377 allows the NAND gate 573 to inhibit the outputs from the memories 422, 423 and 424 into the memory input/output lines. Now the RINC line 402 can clock counts into the clock input of the counter 436. Every time a read sequence is performed, the counter 436 will increase its count by one.

The counter 436 with the help of the decoder 437 then outputs every combination of line numbers and board numbers into the memory input/output lines sequentially starting with line 21a and the first memory board. Immediately after each combination is output, it is read and compared with whichever lines are holding at the time. When a line is found to be on hold, the line connection unit 40 for that line will send a low signal onto the NO DETECTION line 137b causing the read sequence to stop. Two seconds later, the $\overline{\text{FAULT}}$ line 377 goes high, causing counter 436 to reset, disconnecting the inverter 446 from the memory input/output lines, and ceasing to cause the memory outputs to be inhibited from connecting to the memory input/output lines. This completes the description of the fault system 435.

The following table sets forth the values, nomenclature and manufactuer of some of the circuit elements of the system 20.

TABLE OF ELEMENTS

| REFERENCE NO. | DESCRIPTION |
|---|---|
| 24 | 25 pair male Amphenol connector |
| 25 | 25 pair male amphenol connector |
| 26 | 25 pair male Amphenol connector |
| 27 | 25 pair male Amphenol connector |
| 28 | 25 pair female Amphenol connector |
| 29 | 25 pair female Amphenol connector |
| 30 | 25 pair female Amphenol connector |
| 31 | 25 pair female Amphenol connector |
| 61 | General Instrument KBP 02 bridge rectifier |
| 62 | 4.7 K, 1 W resistor |
| 63 | 1 mf. 200 V capacitor |
| 64 | 1N4744A zener diode |
| 65 | Monsanto MCT2 optical isolator |
| 66 | 10 K, ¼ W resistor |
| 67 | 47 K, ¼ W resistor |
| 68 | 10 mf. 15 V tantalum capacitor |
| 69 | ¼ of a CD4001AE integrated circuit, RCA |
| 70 | 1N4148 silicon diode |
| 70a | 1 M, ¼ W resistor |
| 70b | 10 mf, 15 V tantalum Capacitor |
| 70c | 1N4148 silicon diode |
| 71 | ¼ of a CD4011AE integrated circuit, RCA |
| 73 | 1N4148 silicon diode |
| 74 | 1N4148 silicon diode |
| 75 | 1N4148 silicon diode |
| 76 | 1N4148 silicon diode |
| 77 | ¼ of a CD4044AE integrated circuit, RCA |
| 78 | 4.7 K, ¼ W resistor |
| 79 | 2N3415 transistor |
| 80 | Potter and Brumfield R10-E1-Y2-V185 relay |
| 81 | 1N4148 silicon diode |
| 82 | 1.5 K, ¼ W resistor |
| 83 | Light emitting diode panel lamp |
| 84 | 100 ohm, ¼ W resistor |
| 85 | Microtran T2104 transformer |
| 86 | 680 ohm, ¼ W resistor |
| 87 | ¼ of a CD4066AE integrated circuit, RCA |
| 88 | ¼ of a DC4066AE integrated circuit, RCA |
| 89 | 100 mf. 25 V electrolytic capacitor |
| 90 | 6.8 V, 1 W zener diode |
| 91 | 560 ohm, ¼ W resistor |
| 92 | 120 ohm, 2W resistor |
| 93 | ¼ of a CD4044AE integrated circuit, RCA |
| 94 | 100 mf, 25 V electrolytic capacitor |
| 95 | 10 ohm, 5 W potentiometer |
| 96 | Connection for external music or information source |
| 97 | 560 ohm, ¼ W resistor |
| 98 | 330 ohm, ¼ W resistor |
| 99 | ¼ of a CD 4001AE integrated circuit, RCA |
| 100 | ¼ of a CD4044AE integrated circuit, RCA |
| 121 | 1N270 germanium diode bridge |
| 122 | Monsanto MCT2 optical isolator |
| 123 | 2N3414 transistor |
| 124 | 100 ohm, ¼ W resistor |
| 125 | 10K, ¼ W resistor |
| 126 | 1.2 mf, 25 V tantalum capacitor |
| 127 | 47K, ¼ W resistor |
| 128 | ¼ of a CD4011AE integrated circuit, RCA |
| 129 | 47K, ¼ W resistor |
| 131 | 270 K, ¼ W resistor |
| 132 | 22mf, 15 V tantalum capacitor |
| 133 | 1N4148 silicon diode |
| 135 | ¼ of a CD4044AE integrated circuit, RCA |
| 136 | ¼ of a CD4011AE integrated circuit, RCA |
| 147a | 1N4148 silicon diode |
| 138 | CD4514BE integrated circuit, RCA |
| 139 | 47K, ¼ W resistor |
| 140e | Monsanto MCT2 optical isolator |
| 141a | 1N4148 silicon diode |
| 142 | 47K, ¼ W resistor |
| 142a | 1 megohm ¼ W resistor |
| 142b | 1N4148 silicon diode |
| 151 | ¼ of a CD4019AE integrated circuit, RCA |
| 152 | ¼ of a CD4001AE integrated circuit |
| 153 | 2N3415 transistor |
| 153a | 10K, ¼ W resistor |
| 154 | 1.5K ¼ W resistor |
| 155 | Monsanto MCT2 optical isolator |
| 156 | 2N3415 transistor |
| 157 | General Instrument KBP02 bridge rectifier |
| 158 | 10K, ¼ W resistor |
| 159 | ECC L4000K7 triac |
| 160 | 680 ohm, ¼ W resistor |
| 165 | General Instrument KBP02 bridge rectifier |
| 166 | 2N3415 transistor |
| 167 | 330 ohm, ¼ W resistor |
| 168 | 100 ohm, ¼ W resistor |
| 169 | 47K, ¼ W resistor |
| 181 | External microphone: Sony F-85 |
| 183 | Nortronics 6127 |
| 187 | Nortronics 6127 |
| 190 | 3", 3.2 ohm, 0.3 W loudspeaker |
| 202 | 4.7M, ¼ W resistor |
| 203 | 1M, ¼ W resistor |
| 204 | ¼ of a CD4093BE integrated circuit, RCA |
| 205 | 1.2 mf, 25 V tantalum capacitor |
| 206 | 1N4148 silicon diode |
| 207 | 1M, ¼ W resistor |
| 208 | 1.2 mf, 25 V tantalum capacitor |
| 213 | 680 ohms, ¼ W resistor |
| 214 | Monsanto MCT2 optical isolator |
| 215 | 100 ohm, ¼ W resistor |
| 216 | 27K, ¼ W resistor |
| 217 | 1/6 of a CD4049AE integrated circuit, RCA |
| 218 | 10 mf, 25 V tantalum capacitor |
| 219 | 1N4148 silicon diode |
| 220 | ¼ of a CD4001AE integrated circuit, RCA |
| 221 | 22 mf, 15 V tantalum capacitor |
| 222 | 0.1 mf, 50 V ceramic capacitor |
| 224 | 1M, ¼ W resistor |
| 225 | ¼ of a CD4012AE integrated circuit, RCA |
| 226 | ¼ of a CD4011AE integrated circuit, RCA |
| 227 | 4.7 K, ¼ W resistor |
| 228 | 2N3415 transistor |
| 229 | Potter and Brumfield R10-E1-Y2-V185 relay |

-continued
TABLE OF ELEMENTS

| REFERENCE NO. | DESCRIPTION |
|---|---|
| 230a | 1N4148 silicon diode |
| 231 | 4.7K, ¼ W resistor |
| 232 | 0.1 mf, 50 V ceramic capacitor |
| 233 | 47K, ¼ W resistor |
| 234 | 47K, ¼ W resistor |
| 236 | 1N4148 silicon diode |
| 237 | ¼ of a CD4011AE integrated circuit, RCA |
| 238 | ¼ of a CD4011AE integrated circuit, RCA |
| 239 | 4.7K, ¼ W resistor |
| 240 | 180 ohm, ¼ W resistor |
| 241 | 0.01 mf, 50 V ceramic capacitor |
| 242 | 180 ohms, ¼ W resistor |
| 245 | ¼ of a CD4011AE integrated circuit, RCA |
| 247 | 47K, ¼ W resistor |
| 248 | 1 M, ¼ W resistor |
| 249 | 1.2 mf, 25 V tantalum capacitor |
| 251 | 1/6 of a CD4049AE integrated circuit, RCA |
| 252 | 1N4148 silicon diode |
| 253 | 1N4148 silicon diode |
| 254 | 47 K, ¼ W resistor |
| 256 | 270 K, ¼ W resistor |
| 257 | 1.2 mf, 25 V tantalum capacitor |
| 258 | ¼ of a CD4001AE integrated circuit, RCA |
| 259 | 1 M, ¼ W resistor |
| 260 | ¼ of a CD4011AE integrated circuit, RCA |
| 261 | 4.7 K, ¼ W resistor |
| 262 | 2N3415 transistor |
| 263 | 1N4148 silicon diode |
| 264 | Potter and Brumfield R10-E1-Y2-V185 relay |
| 282 | 4.7 K, ¼ W resistor |
| 283 | 27 K, ¼ W resistor |
| 284 | 1N4148 silicon diode |
| 285 | 1N4148 silicon diode |
| 286 | ¼ of a CD4093 BE integrated circuit, RCA |
| 287 | 0.1 mf, 50 V ceramic capacitor |
| 288 | 270 K, ¼ W resistor |
| 289 | CD4024AE integrated circuit, RCA |
| 291 | 3.75 Hz line |
| 292 | ¼ of a CD4001AE integrated circuit, RCA |
| 294 | 47 K, ¼ W resistor |
| 296 | 0.1 mf, 50 V ceramic capacitor |
| 297 | 270 K, ¼ W resistor |
| 298 | ¼ of a CD4093BE integrated circuit, RCA |
| 299 | 1 M, ¼ W resistor |
| 300 | 1/6 of a CD4049AE integrated circuit |
| 302 | 1N4148 silicon diode |
| 311 | ¼ of a CD4001AE integrated circuit, RCA |
| 312 | ¼ of a CD4001AE integrated circuit, RCA |
| 313 | ¼ of a CD4001AE integrated circuit, RCA |
| 314 | ¼ of a CD4520AE integrated circuit, RCA |
| 315 | CD4514BE integrated circuit, RCA |
| 316 | ¼ of a CD4011AE integrated circuit, RCA |
| 318 | ¼ of a CD4001AE integrated circuit, RCA |
| 321 | 47 K, ¼ W resistor |
| 322 | ¼ of a CD4011AE integrated circuit, RCA |
| 323 | ¼ of a CD4011AE integrated circuit, RCA |
| 330 | ¼ of a CD4011AE integrated circuit, RCA |
| 331 | ¼ of a CD4011AE integrated circuit, RCA |
| 334 | ¼ of a CD4011AE integrated circuit, RCA |
| 335 | ¼ of a CD4011AE integrated circuit, RCA |
| 350 | ¼ of a CD4012AE integrated circuit, RCA |
| 351 | 0.1 mf, 50 V ceramic capacitor |
| 352 | 0.1 mf, 50 V ceramic capacitor |
| 353 | 0.1 mf, 50 V ceramic capacitor |
| 354 | 0.1 mf, 50 V ceramic capacitor |
| 355 | 47 K, ¼ W resistor |
| 356 | 47 K, ¼ W resistor |
| 357 | 47 K, ¼ W resistor |
| 358 | 47 K, ¼ W resistor |
| 359 | 1N4148 silicon diode |
| 360 | 0.01 mf, 50 V ceramic capacitor |
| 361 | 47 K, ¼ W resistor |
| 362 | ¼ of a CD4011AE integrated circuit, RCA |
| 363 | ¼ of a CD4011AE integrated circuit, RCA |
| 364 | ¼ of a CD4011AE integrated circuit, RCA |
| 367 | ¼ of a CD4011AE integrated circuit, RCA |
| 368 | ¼ of a CD4011AE integrated circuit, RCA |
| 369 | ¼ of a CD4011AE integrated circuit, RCA |
| 372 | ¼ of a DC4011AE integrated circuit, RCA |
| 373 | ¼ of a CD4011AE integrated circuit, RCA |
| 374 | 1N4148 silicon diode |
| 375 | 10 Mf, 15 V tantalum capacitor |
| 376 | 470 K, ¼ W resistor |
| 382 | 47 K, ¼ W resistor |
| 383 | 0.01 mf, 50 V ceramic capacitor |
| 384 | ¼ of a CD4011AE integrated cicuit, RCA |
| 385 | ¼ of a CD4011AE integrated circuit, RCA |
| 386 | ¼ of a CD4011AE integrated circuit, RCA |
| 387 | ¼ of a CD4011AE integrated circuit, RCA |
| 388 | ¼ of a CD4011AE integrated circuit, RCA |

-continued
TABLE OF ELEMENTS

| REFERENCE NO. | DESCRIPTION |
|---|---|
| 389 | ¼ of a CD4011AE integrated circuit, RCA |
| 393 | ¼ of a CD4011AE integrated circuit, RCA |
| 394 | ¼ of a CD4011AE integrated circuit |
| 396 | ¼ of a CD4520AE integrated circuit, RCA |
| 397 | CD4028AE integrated circuit |
| 400 | ¼ of a CD4011AE integrated circuit, RCA |
| 404 | ¼ of a CD4011AE integrated circuit, RCA |
| 406 | ¼ of a CD4011AE integrated circuit, RCA |
| 407 | 1N4148 silicon diode |
| 420 | 1¼ of a CD4019AE integrated circuit, RCA |
| 421 | CD4515BE integrated circuit, RCA |
| 422 | CD4036AE integrated circuit, RCA |
| 423 | CD4036AE integrated circuit, RCA |
| 424 | CD4036AE integrated circuit, RCA |
| 425 | CD4502BE integrated circuit |
| 426 | ¼ of a CD4011AE integrated circuit |
| 436 | CD4024AE integrated circuit, RCA |
| 437 | CD4029AE integrated circuit, RCA |
| 438 | 1/6 of a CD4049AE integrated circuit, RCA |
| 439 | 1/6 of a CD4049AE integrated circuit, RCA |
| 440 | 1/6 of a CD4049 AE integrated circuit, RCA |
| 441 | 1/6 of a CD4049AE integrated circuit |
| 442 | 1/6 of a CD4049AE integrated circuit |
| 443 | 1/6 of a CD4049AE integrated circuit |
| 444 | ¼ of a CD4011AE integrated circuit |
| 445 | ¼ of a CD4011AE integrated circuit, RCA |
| 446 | 1¼ of CD4091AE integrated circuit |
| 447 | 10 K, ¼ W resistor |
| 448 | 10 K, ¼ W resistor |
| 449 | 10 K, ¼ W resistor |
| 450 | 10 K, ¼ W resistor |
| 501 | 1N4148 silicon diode |
| 502 | 0.01 mf, 50 V ceramic capacitor |
| 503 | 470 K, ¼ W resistor |
| 504 | 1/6 of a CD4049AE integrated circuit, RCA |
| 505 | 1/6 of a CD4049AE integrated circuit, RCA |
| 506 | 4.7 K, ¼ W resistor |
| 508 | 2N3415 transistor |
| 509 | 2N3415 transistor |
| 511 | Six digit electromechanical counter |
| 512 | 330 ohm, 1 W resistor |
| 512a | 1N4148 silicon diode |
| 513 | 0.1 mf, 50 V ceramic capacitor |
| 514 | ¼ of a CD4093BE integrated circuit, RCA |
| 515 | 0.1 mf, 50 V ceramic capacitor |
| 516 | 470 K, ¼ W resistor |
| 517 | 47 K, ¼ W resistor |
| 519 | 1/6 of a CD4049AE integrated circuit, RCA |
| 520 | 4.7 K, ¼ W resistor |
| 522 | 2N3415 transistor |
| 523 | 2N3495 transistor |
| 525 | Six digit electromechanical counter |
| 526 | 0.1 mf, 50 V ceramic capacitor |
| 526a | 1N4148 silicon diode |
| 527 | 4400 mf, 25 V electrolytic capacitor |
| 528 | 1N4148 silicon diode |
| 529 | 0.1 mf, 50 V ceramic capacitor |
| 143 | ¼ of a CD4011AE integrated circuit, RCA |
| 144 | 1 M, ¼ W resistor |
| 145 | 1.2 mf, 25 V tantalum capacitor |
| 146 | 1N4148 silicon diode |
| 246 | 1N4148 silicon diode |

To those skilled in the art to which this invention relates, many changes in construction and widely differing embodiments and applications of the invention will suggest themselves without departing from the spirit and scope of the invention. The disclosure and the description herein are purely illustrative and are not intended to be in any sense limiting.

I claim:

1. For use in combination with a subscriber's key telephone service unit connected to a plurality of incoming telephone lines, said unit being connected to at least one key telephone instrument provided with a plurality of indicator keys each for indicating visually the arrival of an incoming call thereon and for enabling an operator to select between said lines and to answer one of them at a time, an automatic call sequencing system comprising scanning means connected to said lines for scanning said lines and for detecting arrival of an incoming call on each of said lines;

identifier means connected to said scanning means for identifying each line following detection of an unanswered call thereon by providing a line connection unit identifier signal;

queue memory means connected to said identifier means for storing in order of receipt all of said line connection unit identifier signals and for providing a queue-first control signal corresponding to said line having the oldest unanswered call, said queue memory means having an output queuing circuit responsive to said queue-first control signal;

key blinking control means connected to said key telephone instrument keys and to said output queuing circuit for providing said key corresponding to said line having the oldest unanswered call with a visual indication distinctly differing from visual indications of other said keys for lines having less senior unanswered incoming calls;

operator interrupt detection means connected to said lines and to said output queuing circuit for detecting the answering of said line having the oldest unanswered call by the operator and thereupon for advancing said queue memory means to a said line connection unit identifier signal being next in order whereupon a queue-first control signal is provided from said queue memory means through said output register queuing circuit to the said key corresponding to the next line then having the oldest unanswered call.

2. The system set forth in claim 1 wherein said scanning means is connected to scan all of said lines upon detection of an incoming call on any one of said lines for automatically terminating such lines, and for signalling completion of said scan.

3. The system set forth in claim 2 further comprising calling party disconnect detection means connected to said scanning means and to said output queuing circuit for automatically unterminating a terminated line having an incoming call in which the calling party has hung up before the operator has answered and for automatically advancing said queue memory means to the next in order line connection unit identifier signal when said line connection unit identifier signal for said line having said hung up call would otherwise become the line then having the oldest unanswered call.

4. The system set forth in claim 3 further compromising dropped call counting means connected to said calling party disconnect detection means for counting the total of detected calls disconnected by the calling party.

5. The system set forth in claim 1 further comprising recorded message delivery means and first audio switch means connected to said lines and to said recorded message delivery means, said recorded message delivery means being connected to said scanning means so that a recorded message is initiated upon completion of said scan, and said first audio switch means being connected to said scanning means for switching said recorded message to said terminated yet unanswered lines.

6. The system set forth in claim 5 wherein said recorded message delivery means provides a completion signal at the conclusion of said recorded message and further comprising a source of background music and second audio switch means connected to said source, to said lines and to said message delivery means, said second audio switch means for switching background music to those lines having just received said recorded message in response to said completion signal.

7. The system set forth in claim 5 further comprising function selector means connected to said scanning means and to said recorded message delivery means for enabling said recorded message to be delivered and for unterminating said lines upon completion of said recorded message as a selectable alternative functional mode of said call sequencing system.

8. The system set forth in claim 1 further comprising busy line detection means connected to said scanning means and to said instrument for inhibiting said scanning means from scanning in the event that the operator is not then using said key telephone instrument.

9. The system set forth in claim 1 further comprising total call counting means connected to said scanning means for counting the total of calls detected by said scanning means.

10. In electrical connection to multiple incoming telephone lines of a standard multiple line key telephone instrument and to its key service line circuit equipment, an automatic telephone answering and sequencing system comprising:

a plurality of line connection circuit means each being connected to a corresponding said incoming line for automatically terminating said line upon detection of an incoming call in the event that an attendant is already using said instrument, for ceasing to terminate said line when it is answered at said telephone instrument and also in the event that the calling party disconnects, for gating audio signals to said line and for providing a key of said instrument corresponding to the line to which said connection circuit means is connected with a lamp flashing priority signal distinctly different from other flashing signals from a priority control signal identifying said call incoming upon said line as the oldest among incoming calls not yet handled by an attendant at said instrument;

read and write memory means for storing the order of arrival of all incoming unattended calls and the identity of the lines having said calls, and for reading out as a priority control signal the identity of the single line having the oldest among incoming unattended calls;

a plurality of audio signal delivery means each being connected to a corresponding said line connection circuit means for delivering audio signals to selected ones of said lines;

system control means connected to each said line connection circuit means, said read and write memory means and said audio signal delivery means, said control means for scanning all of said line connection circuit means upon detection of an incoming call, for writing into said read and write memory means said order of arrival of said incoming calls and said identity of lines, for reading from said memory means said priority control signal and sending it to the identified line connection circuit means identified thereby and for starting said audio signal delivery means at the completion of each scan of all of said line connection circuit means.

11. The system set forth in claim 10 additionally comprising fault circuit memory restoration means connected to system control means and to said read and write memory means for restoring therein the identity of the lines having incoming unattended calls in a predetermined order not necessarily corresponding to priority of receipt in the event that said read and write memory means looses said line identification information previously stored therein.

12. The system set forth in claim 10 wherein said audio signal delivery means comprises announcement playback means for providing an initial expository announcement to said line connection circuit means and background music means for providing background music to said line connection circuit means, which additionally comprises audio switch means controlled by said announcement playback means for switching said telephone line to said background music means upon completion of playback of said expository announcement.

13. The system set forth in claim 10 additionally comprising statistical accumulation and reporting means connected to said system control means for counting and reporting the operations of said answering and sequencing system.

14. The system set forth in claim 13 wherein said statistical accumulation and reporting means includes total call count means for counting and reporting the total number of incoming calls handled by said system during a predetermined time interval.

15. The system set forth in claim 13 wherein said statistical accumulation and reporting means includes dropped call count means for counting and reporting the total number of incidents wherein the calling party has disconnected before an attendant reached the line carrying said calling party's incoming call.

16. The system set forth in claim 10 wherein each said line connection circuit means includes a light emitting diode and a phototransistor configured together as an optical isolator for detecting the occurrence of an incoming call.

17. The system set forth in claim 10 wherein each said line connection circuit means includes a light emitting diode and a phototransistor configured together as an optical isolator for detecting when said line is answered by an attendant at said instrument.

18. The system set forth in claim 10 wherein each said line connection circuit means includes a light emitting diode and a phototransistor configured together as an optical isolator for detecting if the calling party has disconnected before the line is answered at said instrument.

19. The system set forth in claim 10 wherein each said line connection circuit means includes a triac controlled by a phototransistor of an optical isolator for providing said key with said lamp flashing priority signal.

20. The system set forth in claim 10 wherein said system control means generates system clocking signals from the power line frequency.

21. The system set forth in claim 10 wherein each said line connection circuit means includes a light emitting diode and a phototransistor configured together as an optical isolator for detecting that said attendant is already using said instrument.

22. The system set forth in claim 10 for use with a plurality of parallel connected key service telephone instruments.

23. An automatic call sequencing system for connection within a telephone subscriber's key telephone service installation servicing a plurality of incoming telephone lines and including at least one key telephone instrument having a plurality of illuminable selector keys each corresponding to a said incoming line and in labeling the line to be selected and answered, said system comprising:

a plurality of incoming call detection means, each for detecting an incoming ringing signal upon a said line to which it is connected;

scanning means connected to said lines and to said incoming call detection means, for scanning all of said lines when an incoming ringing signal is detected by said call detection means;

a plurality of identifier means connected to said call detection means and to said scanning means, each for providing a line identification signal for the said line to which it corresponds when interrogated by said scanning means and when an incoming ringing signal is present on said line, queue memory stack means connected to said plurality of identifier means for storing in order of receipt all of said line identification signals scanned by said scanning means, and for reading out a queue first control signal corresponding to said line having said oldest unanswered call;

a plurality of key lamp signal control means each connected to operate the lamp of the corresponding key of said telephone instrument, and connected to said queue memory stack means to respond to said queue first control signal, said key lamp signal control means for providing a said key corresponding to said line having the oldest unanswered call with a visual indication distinctly differing from visual indications of others of said keys for lines having less senior unanswered calls;

a plurality of operator interrupt detection means, each connected to a corresponding incoming line and to queue memory stack means, for detecting the occurrence of the operator's answering the said line having the oldest unanswered incoming call and for thereupon advancing said queue memory stack means to the next oldest line identification signal stored therein, whereupon a queue first control signal corresponding to the line thus identified is output by said queue memory stack means and a key lamp signal control means corresponding to the line thus identified causes a distinctly different visual indication at the key for said line.

* * * * *